US011536667B2

(12) United States Patent
Kato et al.

(10) Patent No.: US 11,536,667 B2
(45) Date of Patent: Dec. 27, 2022

(54) IMAGE INSPECTION APPARATUS AND IMAGE INSPECTION METHOD

(71) Applicant: OMRON Corporation, Kyoto (JP)

(72) Inventors: Yutaka Kato, Kyotanabe (JP); Shingo Inazumi, Amagasaki (JP)

(73) Assignee: OMRON Corporation, Kyoto (JP)

( * ) Notice: Subject to any disclaimer, the term of this patent is extended or adjusted under 35 U.S.C. 154(b) by 1018 days.

(21) Appl. No.: 16/247,597

(22) Filed: Jan. 15, 2019

(65) Prior Publication Data

US 2019/0265170 A1 Aug. 29, 2019

(30) Foreign Application Priority Data

Feb. 23, 2018 (JP) .............................. JP2018-030930

(51) Int. Cl.
*G01N 21/88* (2006.01)
*G01N 21/47* (2006.01)
*G01B 11/25* (2006.01)

(52) U.S. Cl.
CPC ...... *G01N 21/8806* (2013.01); *G01B 11/2513* (2013.01); *G01B 11/2527* (2013.01); *G01N 21/47* (2013.01); *G01N 21/8851* (2013.01); *G01N 2021/4711* (2013.01); *G01N 2021/8887* (2013.01)

(58) Field of Classification Search
CPC ............... G01N 21/8806; G01N 21/47; G01N 21/8851; G01N 2021/4711; G01N 2021/8887; G01B 11/2513; G01B 11/2527
See application file for complete search history.

(56) References Cited

U.S. PATENT DOCUMENTS 7,193,697 B2   3/2007 Sung et al.
2007/0019186 A1   1/2007 Sung et al.
(Continued)

FOREIGN PATENT DOCUMENTS

CN   1350202   5/2002
JP   2008185380   8/2008
(Continued)

OTHER PUBLICATIONS

"Search Report of Europe Counterpart Application", dated Jun. 19, 2019, p. 1-p. 7.
(Continued)

*Primary Examiner* — Tracy Y. Li
(74) *Attorney, Agent, or Firm* — JCIPRNET

(57) ABSTRACT

The image inspection apparatus includes an image capturing unit which captures images of an object, a transparent illumination unit disposed between the object and the image capturing unit, and a control unit configured to control the image capturing unit and the illumination unit. The illumination unit radiates light to the object in a first direction and causes the light to scan and radiates light to the object in a second direction and causes the light to scan. The image capturing unit captures images of the object. The control unit identifies a light-emitting position of the illumination unit when a measurement point of the surface of the object is illuminated from images of the object captured, and calculates a distance to the measurement point on the basis of the identified light-emitting position, the first direction and the second direction.

20 Claims, 17 Drawing Sheets

(56) References Cited

U.S. PATENT DOCUMENTS

| | | | |
|---|---|---|---|
| 2015/0015701 A1* | 1/2015 | Yu ........................ | H04N 5/2259 |
| | | | 348/136 |
| 2015/0116461 A1 | 4/2015 | Schinner et al. | |
| 2015/0355101 A1 | 12/2015 | Sun | |
| 2017/0115497 A1 | 4/2017 | Chen et al. | |
| 2018/0343438 A1* | 11/2018 | Cho ..................... | H04N 13/254 |
| 2018/0367722 A1* | 12/2018 | Hashiguchi ........ | H04N 5/23232 |
| 2020/0116648 A1* | 4/2020 | Sugihara ............ | G01N 21/8806 |

FOREIGN PATENT DOCUMENTS

| | | |
|---|---|---|
| JP | 2009164033 | 7/2009 |
| JP | 2009264862 | 11/2009 |
| JP | 2014096253 | 5/2014 |
| JP | 2015148583 | 8/2015 |
| JP | 2017062120 | 3/2017 |
| WO | 2007026690 | 3/2007 |

OTHER PUBLICATIONS

Office Action of Japan Counterpart Application, with English translation thereof, dated Mar. 23, 2021, pp. 1-10.
"Office Action of China Counterpart Application", dated Apr. 2, 2021, with English translation thereof, pp. 1-18.

* cited by examiner

IMAGE INSPECTION APPARATUS AND IMAGE INSPECTION METHOD

CROSS-REFERENCE TO RELATED APPLICATION

This application claims the priority benefit of Japanese application serial no. 2018-030930, filed on Feb. 23, 2018. The entirety of the above-mentioned patent application is hereby incorporated by reference herein and made a part of this specification.

BACKGROUND

Technical Field

The present technology relates to an image inspection apparatus and an image inspection method for inspecting an object using a captured image.

Description of Related Art

In the field of factory automation and the like, capturing an image of an object while illuminating the object and inspecting the exterior of the object using the acquired captured image is known.

For example, Japanese Laid-Open No. 2017-62120 (Patent Document 1) discloses an inspection system using an illumination device including a surface light source, and a lens, a light-shielding mask and a filter disposed between the surface light source and an inspection target. In this system, a radiation solid angle of inspection light radiated to each point of the inspection target is formed approximately uniformly according to the lens, the light-shielding mask and the filter. Accordingly, a whole visual field can be uniformly radiated to improve object inspection accuracy.

According to the conventional method, it is necessary to previously identify a relative position of the illumination device with respect to an image capturing unit (camera) when an object is inspected. Accordingly, adjustment (calibration) for determining a relative position between the image capturing unit and the illumination device needs to be performed before the object is inspected. However, it is desirable that as little calibration as possible be necessary from the viewpoint of user convenience.

SUMMARY

According to this disclosure, an image inspection apparatus includes: an image capturing unit which captures images of an object; a transparent illumination unit which is disposed between the object and the image capturing unit, has a light-emitting surface which radiates light to the object and is configured to be able to control a light-emitting position on the light-emitting surface and a radiation direction of the light; and a control unit which is configured to control the image capturing unit and the illumination unit. The control unit causes the illumination unit to radiate light to the object in a first direction and causes the light to scan by changing the light-emitting position on the light-emitting surface in first scanning of the illumination unit, and causes the image capturing unit to capture images of the object during the first scanning. The control unit causes the illumination unit to radiate light to the object in a second direction different from the first direction and causes the light to scan by changing the light-emitting position on the light-emitting surface in second scanning of the illumination unit, and causes the image capturing unit to capture images of the object during the second scanning. The control unit identifies a light-emitting position of the illumination unit when a measurement point of the surface of the object is illuminated from images of the object captured during the first scanning and the second scanning, and calculates a distance to the measurement point on the basis of the identified light-emitting position, the first direction and the second direction.

DESCRIPTION OF THE EMBODIMENTS

Figure 1:
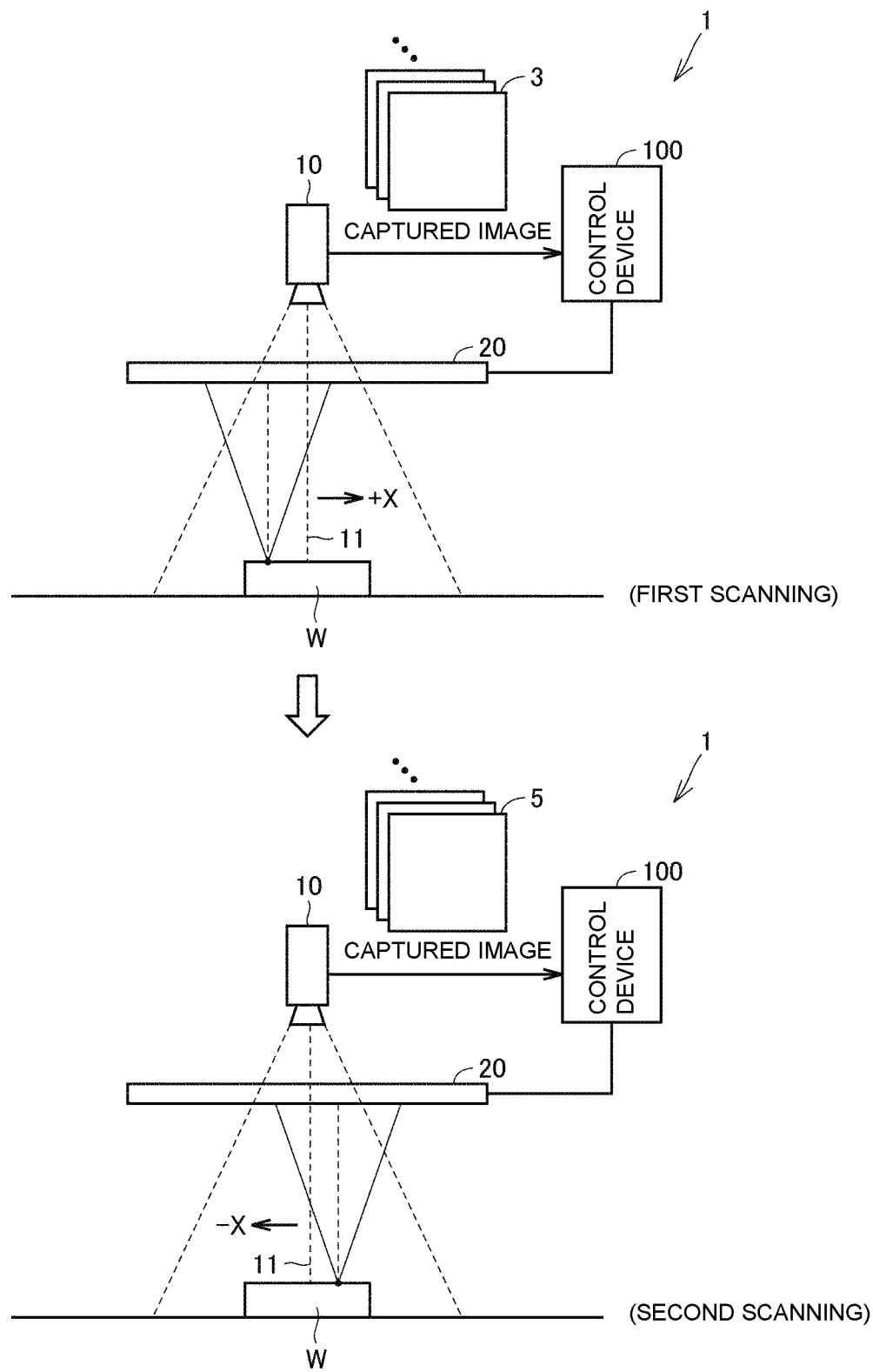
FIG. 1 is a diagram schematically showing an image inspection apparatus according to the present embodiment.

The disclosure provides an image inspection apparatus and an image inspection method capable of performing inspection of an object without a necessity for calibration between an image capturing unit and an illumination device.

According to this disclosure, an image inspection apparatus includes: an image capturing unit which captures images of an object; a transparent illumination unit which is disposed between the object and the image capturing unit, has a light-emitting surface which radiates light to the object and is configured to be able to control a light-emitting position on the light-emitting surface and a radiation direction of the light; and a control unit which is configured to control the image capturing unit and the illumination unit. The control unit causes the illumination unit to radiate light to the object in a first direction and causes the light to scan by changing the light-emitting position on the light-emitting surface in first scanning of the illumination unit, and causes the image capturing unit to capture images of the object during the first scanning. The control unit causes the illumination unit to radiate light to the object in a second direction different from the first direction and causes the light to scan by changing the light-emitting position on the light-emitting surface in second scanning of the illumination unit, and causes the image capturing unit to capture images of the object during the second scanning. The control unit identifies a light-emitting position of the illumination unit when a measurement point of the surface of the object is illuminated from images of the object captured during the first scanning and the second scanning, and calculates a distance to the measurement point on the basis of the identified light-emitting position, the first direction and the second direction.

According to this disclosure, the control unit controls a light-emitting position of the illumination unit and thus can acquire information about the light-emitting position. The light-emitting position does not depend on a relative position between the image capturing unit and the illumination unit. That is, it is not necessary to dispose the illumination unit at a specific position with respect to the optical axis of the image capturing unit. Accordingly, an image inspection apparatus capable of inspecting an object without a necessity for calibration between an image capturing unit and an illumination device can be provided.

In the above-described disclosure, the image capturing unit captures images of the object multiple times to generate a plurality of first captured images during the first scanning and captures images of the object multiple times to generate a plurality of second captured images during the second scanning. The control unit generates a first processing image having information about a first light-emitting position which is a light-emitting position for illuminating the measurement point of the object from the plurality of first captured images. The control unit generates a second processing image having information about a second light-emitting position which is a light-emitting position for illuminating the measurement point of the object from the plurality of second captured images. The control unit calculates the distance from the information about the first light-emitting position included in the first processing image, the information about the second light-emitting position included in the second processing image, the first direction and the second direction.

According to this disclosure, the control unit generates a processing image from a plurality of images captured by the image capturing unit. Regarding the processing image, a processing image including information about a light-emitting position of the illumination unit when a point (measurement point) of the surface of the object is illuminated is generated. The processing image includes information about the light-emitting position. The control unit can calculate the distance using the information.

In the above-described disclosure, the illumination unit radiates light in a line form to the object during the first scanning and the second scanning. The control unit determines a light-emitting position of the illumination unit when the luminance of a pixel corresponding to the measurement point is maximized as the first light-emitting position from the plurality of first captured images and generates the first processing image by including the first light-emitting position in information about the pixel. The control unit determines a light-emitting position of the illumination unit when the luminance of the pixel corresponding to the measurement point is maximized as the second light-emitting position from the plurality of second captured images and generates the second processing image by including the second light-emitting position in information about the pixel.

According to this disclosure, a distance can be calculated using a light sectioning method.

In the above-described disclosure, the illumination unit radiates light in a striped pattern to the object and generates a state equivalent to scanning of the light by changing the phase of the striped pattern during the first scanning and the second scanning. The control unit generates the first processing image from the plurality of first captured images by including information about a first phase of the striped pattern in the information about the pixel as information about the first light-emitting position. The control unit generates the second processing image from the plurality of second captured images by including information about a second phase of the striped pattern in the information about the pixel as information about the second light-emitting position.

According to this disclosure, a distance can be calculated using a phase shift method.

In the above-described disclosure, the illumination unit includes a plurality of light-emitting units which are arranged in a matrix form and configured to be able to selectively emit light, and an optical system which is configured to control a radiation direction of light emitted from each of the plurality of light-emitting units to be a direction corresponding to the position of each of the plurality of light-emitting units.

According to this disclosure, a radiation solid angle can be arbitrarily changed by selecting a light-emitting unit to emit light from the plurality of light-emitting units. The light-emitting unit to emit light can be selected according to a place of a visual field. Accordingly, an image inspection apparatus capable of arbitrarily setting a radiation solid angle for each place of a visual field can be realized. Furthermore, since the radiation solid angle can be arbitrarily changed, for example, an optical part such as a slit or a half mirror can be unnecessary. Accordingly, the illumination device can be reduced in size. As a result, an image inspection apparatus capable of arbitrarily setting a radiation solid angle and being reduced in size can be realized.

In the above-described disclosure, the optical system includes a plurality of micro-lenses provided to face the plurality of light-emitting units.

According to this disclosure, an image inspection apparatus capable of being reduced in size can be realized.

In the above-described disclosure, the plurality of micro-lenses are disposed such that optical axes of at least some of the plurality of micro-lenses deviate from optical axes of light-emitting units facing the at least some of the micro-lenses.

According to this disclosure, a radiation direction of light can be controlled according to a simple configuration.

In the above-described disclosure, the illumination unit is sectioned into a plurality of illumination elements. At least some of the micro-lenses are disposed at a pitch less than a pitch of the light-emitting units in at least one of the plurality of illumination elements.

According to this disclosure, a radiation direction of light can be controlled according to a simple configuration.

In the above-described disclosure, the plurality of micro-lenses are disposed such that the optical axes of at least some of the plurality of micro-lenses are inclined with respect to the optical axes of light-emitting units facing the at least some of the micro-lenses.

According to this disclosure, a radiation direction of light can be controlled according to a simple configuration.

In the above-described disclosure, the illumination unit further includes a light-shielding part configured to shield light leaking from the edge of each of the plurality of micro-lenses among light emitted from the plurality of light-emitting units.

According to this disclosure, the possibility of light from light-emitting units leaking in an unintended direction can be reduced.

According to one example of the present disclosure, an image inspection method performed by an image inspection apparatus including: an image capturing unit which captures images of an object; a transparent illumination unit which is disposed between the object and the image capturing unit, has a light-emitting surface which radiates light to the object and is configured to be able to control a light-emitting position on the light-emitting surface and a radiation direction of the light; and a control unit which is configured to control the image capturing unit and the illumination unit is provided. The image inspection method includes: a step in which the illumination unit radiates light to the object in a first direction and causes the light to scan by changing the light-emitting position on the light-emitting surface in first scanning, and the image capturing unit captures images of the object during the first scanning; a step in which the illumination unit radiates light to the object in a second direction different from the first direction and causes the light to scan by changing the light-emitting position on the light-emitting surface in second scanning, and the image capturing unit captures images of the object during the second scanning; and a step in which the control unit identifies the light-emitting position of the illumination unit when a measurement point of the surface of the object is illuminated from images of the object captured during the first scanning and the second scanning, and calculates a distance to the measurement point on the basis of the identified light-emitting position, the first direction and the second direction.

According to this disclosure, an image inspection method capable of inspecting an object without a necessity for calibration between an image capturing unit and an illumination device can be provided.

In the above-described disclosure, the step in which the image capturing unit captures images of the object during the first scanning includes a step in which the image capturing unit captures images of the object multiple times to generate a plurality of first captured images. The step in which the image capturing unit captures images of the object during the second scanning includes a step in which the image capturing unit captures images of the object multiple times to generate a plurality of second captured images. The step of calculating the distance includes: a step in which the control unit generates a first processing image having information about a first light-emitting position which is the light-emitting position for illuminating the measurement point of the object from the plurality of first captured images; a step in which the control unit generates a second processing image having information about a second light-emitting position which is the light-emitting position for illuminating the measurement point of the object from the plurality of second captured images; and a step of calculating the distance from the information about the first light-emitting position included in the first processing image, the information about the second light-emitting position included in the second processing image, the first direction and the second direction.

According to this disclosure, since a processing image includes information about a light-emitting position, a distance can be calculated using the information.

In the above-described disclosure, the step in which the illumination unit radiates the light to the object includes a step in which the illumination unit radiates light in a pattern of a line form to the object. The step of generating the first processing image includes a step in which the control unit determines the light-emitting position of the illumination unit when the luminance of a pixel corresponding to the measurement point is maximized as the first light-emitting position from the plurality of first captured images and generates the first processing image by including the first light-emitting position in information about the pixel. The step of generating the second processing image includes a step in which the control unit determines the light-emitting position of the illumination unit when the luminance of the pixel corresponding to the measurement point is maximized as the second light-emitting position from the plurality of second captured images and generates the second processing image by including the second light-emitting position in information about the pixel.

According to this disclosure, a distance can be calculated using a light sectioning method.

In the above-described disclosure, the step in which the illumination unit radiates the light to the object includes a step in which the illumination unit radiates light in a striped pattern to the object and generates a state equivalent to scanning of the light by changing the phase of the striped pattern. The step of generating the first processing image includes a step in which the control unit generates the first processing image from the plurality of first captured images by including information about a first phase of the striped pattern in the information about the pixel as information about the first light-emitting position. The step of generating the second processing image includes a step in which the control unit generates the second processing image from the plurality of second captured images by including information about a second phase of the striped pattern in the information about the pixel as information about the second light-emitting position.

According to this disclosure, a distance can be calculated using a phase shift method.

According to the present disclosure, it is possible to provide an image inspection apparatus and an image inspection method capable of inspecting an object without a necessity for calibration between an image capturing unit and an illumination device.

Embodiments of the present disclosure will be described in detail with reference to the drawings. The same or corresponding parts in the figures are denoted by the same reference signs and description thereof will not be repeated.

A. Example of Application

First, an example of a situation to which the present disclosure is applied will be described with reference to FIG. 1. FIG. 1 is a diagram schematically showing an image inspection apparatus 1 according to the present embodiment.

The image inspection apparatus 1 according to the present embodiment is applied to an apparatus which captures an image of an object (hereinafter referred to as a "workpiece W") while illuminating the object and inspects the exterior (for scratches, contamination, foreign materials and the like) of the workpiece W using the acquired captured image in a production line for industrial products, and the like. The image inspection apparatus 1 inspects a workpiece W by detecting light reflected by the workpiece W. Accordingly, a workpiece having a surface which reflects light is applicable to the workpiece W.

As an example, a workpiece W has a surface which diffuses and reflects light. A material which diffuses and reflects light may be a resin or a metal, for example. Meanwhile, it is not necessary to limit the workpiece W such that the entire surface thereof diffuses and reflects light. Only a part to which light is radiated may diffuse and reflect the light. Further, if the present embodiment is applicable, the material of the workpiece W need not be limited to a resin or a metal.

The image inspection apparatus 1 includes a camera 10 which is an example of an image capturing unit, an illumination device 20 which is an example of an illumination unit, and a control device 100 which is an example of a control unit configured to control the camera 10 and the illumination device 20.

The camera 10 captures an image of a workpiece W which is an object to generate a captured image of the workpiece W.

The illumination device 20 is disposed between the camera 10 and the workpiece W and has a light-emitting surface which radiates light to the workpiece W. The illumination device 20 is configured to be able to control a light-emitting position on the light-emitting surface and a radiation direction of light.

Further, the illumination device 20 has translucency. The camera 10 captures an image of the workpiece W over the illumination device 20. It is desirable that the illumination device 20 have a degree of translucency at which the camera 10 can capture an image of the workpiece W through the illumination device 20.

The illumination device 20 can change a radiation direction of light and an illumination pattern according to an instruction from the control device 100. In addition, the illumination device 20 radiates light such that the light is caused to scan on the surface of the workpiece W according to an instruction from the control device 100. Here, the camera 10 captures images of the workpiece W to acquire a plurality of captured images.

The control device 100 causes the illumination device 20 to radiate light to the workpiece W in a first direction in first scanning of the illumination device 20. In addition, the control device 100 causes light to be scanned by changing a light-emitting position in the light-emitting surface of the illumination device 20. For example, the illumination device 20 radiates light to the workpiece W in a direction that forms a predetermined angle with the optical axis 11 (optical center) of the camera 10 and causes the light to scan in a +X direction in the first scanning. During scanning of light, the control device 100 causes the camera 10 to capture images of the workpiece W multiple times. Accordingly, the camera 10 generates a plurality of captured images 3.

In second scanning of the illumination device 20, the control device 100 causes the illumination device 20 to radiate light to the workpiece W in a direction different from the radiation direction in the first scanning. Further, the control device 100 causes light to be scanned by changing the light-emitting position on the light-emitting surface of the illumination device 20. For example, the illumination device 20 radiates light to the workpiece W in a direction reverse to the radiation direction in the first scanning and causes the light to scan in a −X direction in the second scanning. During scanning of light, the control device 100 causes the camera 10 to capture images of the workpiece W multiple times as in the first scanning. Accordingly, the camera 10 generates a plurality of captured images 5.

The control device 100 identifies a light-emitting position of the illumination device 20 when a measurement point of the surface of the workpiece W is illuminated from the images (the plurality of captured images 3 and the plurality of captured images 5) of the workpiece W captured in the first scanning and the second scanning. A "measurement point" is a position on the surface of the workpiece W at which a distance from the light-emitting surface will be measured. The control device 100 calculates a distance between the light-emitting surface of the illumination device 20 and the measurement point on the basis of the identified light-emitting position, the light radiation direction (first direction) in the first scanning and the light radiation direction (second direction) in the second scanning.

Figure 2:
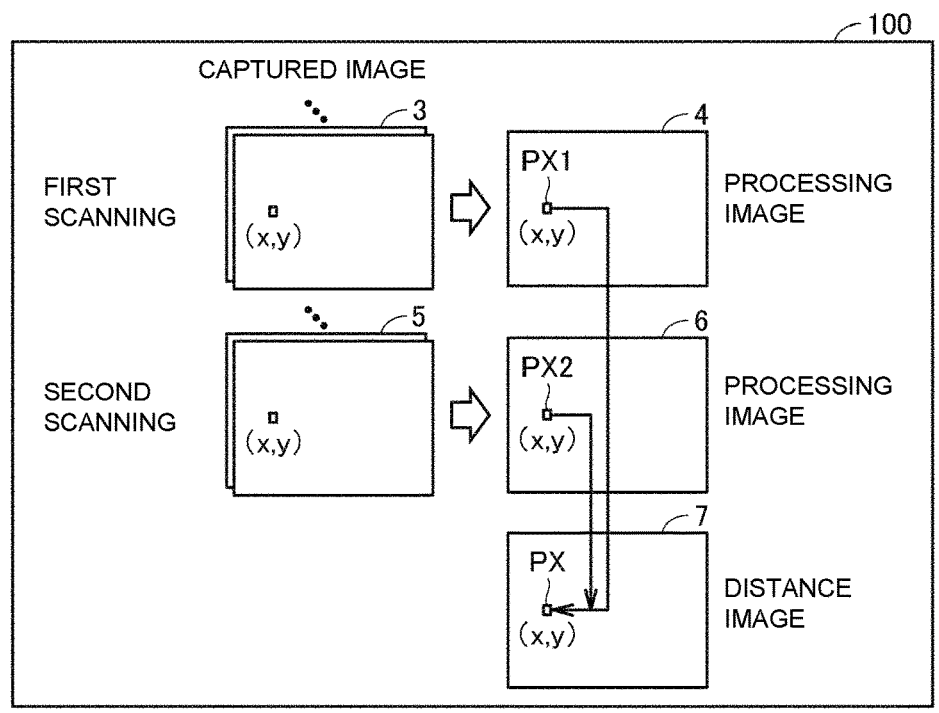
FIG. 2 is a schematic diagram for describing a process performed by a control device shown in FIG. 1.

FIG. 2 is a schematic diagram for describing a process performed by the control device shown in FIG. 1. As shown in FIG. 2, the control device 100 generates a processing image from a plurality of captured images. The plurality of captured images have a plurality of pixels disposed in 2 dimensions. Accordingly, the same number of pixels as the number of captured images is acquired at each pixel position. The control device 100 selects one pixel from such a plurality of pixels to generate a processing image.

In the first scanning, a processing image 4 having information about a first light-emitting position which is a light-emitting position for illuminating the measurement point of the workpiece W is generated from the plurality of captured images 3. A pixel PX1 positioned at a pixel position (x, y) is a pixel selected from pixels at the same pixel position (x, y) of the plurality of captured images 3. The pixel PX1 has information about the first light-emitting position as a pixel value.

In the second scanning, a processing image 6 having information about a second light-emitting position which is a light-emitting position for illuminating the measurement point of the workpiece W is generated from the plurality of captured images 5. A pixel PX2 positioned at a pixel position (x, y) is a pixel selected from pixels at the same pixel position (x, y) of the plurality of captured images 5. The pixel PX2 has information about the second light-emitting position as a pixel value. The position (x, y) of the pixel PX2 within the processing image 6 is the same as the pixel position (x, y) in the pixel PX1 within the processing image 4.

The control device 100 calculates a distance between the illumination device 20 and the workpiece W for each pixel on the basis of the processing images 4 and 6. Specifically, the control device 100 calculates a distance between the light-emitting surface of the illumination device 20 and the position of the surface (measurement point) of the workpiece W on the basis of information on the first light-emitting position included in the pixel PX1 of the processing image 4, information on the second light-emitting position included in the pixel PX2 of the processing image 6, and the light radiation directions (the first direction and the second direction) in the first scanning and the second scanning. The control device 100 generates a distance image 7 including a pixel PX having the calculated distance as a pixel value.

In this manner, the information included in the pixel PX1 of the processing image 4 and the information included in the pixel PX2 at the same position as the pixel PX1 in the processing image 6 are used in order to calculate the distance between the illumination device 20 and the surface of the workpiece W. The radiation direction of light emitted from the illumination device 20 and the light-emitting position in the illumination device 20 are controllable. Accordingly, the control device 100 can have information about the light-emitting position and the radiation direction.

Since the distance between the center point of the illumination device 20 and the light-emitting position is recognized in advance, the position of the camera 10 with respect to the illumination device 20 is not particularly limited. That is, is it not necessary to dispose the illumination device at a specific position with respect to the optical axis of the image capturing unit. Accordingly, it is possible to provide an image inspection apparatus and an image inspection method capable of inspecting an object without a necessity for calibration between the imaging capturing unit and the illumination device.

B. Example of Production Line to which Image Inspection Apparatus is Applied

Figure 3:
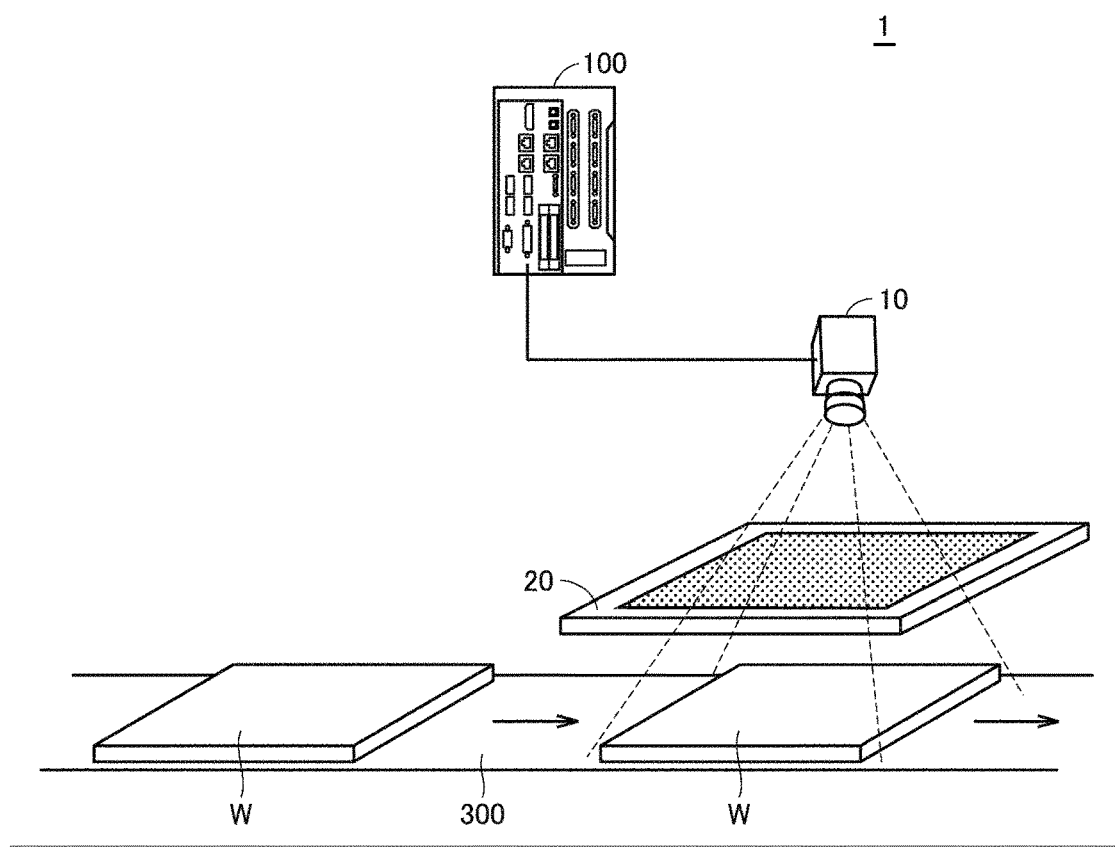
FIG. 3 is a schematic diagram showing an example of a production line to which the image inspection apparatus according to the present embodiment is applied.

Next, an example of a production line to which the image inspection apparatus 1 is applied will be described with reference to FIG. 3. FIG. 3 is a schematic diagram showing an example of a production line to which the image inspection apparatus 1 according to the present embodiment is applied. The image inspection apparatus 1 captures images of a workpiece W using the camera 10 while illuminating the workpiece W through the illumination device 20 and inspects the exterior of the workpiece W using the acquired captured images in a production line for industrial products, and the like. Specifically, the workpiece W which is an inspection target is moved by a movable stage 300 to an inspection position at which the camera 10 and the illumination device 20 are fixed. When the workpiece W is moved to the inspection position, the workpiece W remains still in that place until exterior inspection performed by the image inspection apparatus 1 ends. Here, the control device 100 captures images of the workpiece W using the camera 10 while illuminating the workpiece W through the illumination device 20 and displays the captured images on a monitor. Accordingly, an operator inspects the exterior of the workpiece W while viewing the colors of the captured images displayed on a monitor screen. Alternatively, the control device 100 may perform predetermined image processing on the captured images and perform abnormality determination with respect to the workpiece W on the basis of an image processing result.

For example, the control device 100 may include a processor such as a central processing unit (CPU) or a micro-processing unit (MPU), a random access memory (RAM), a display controller, a system controller, an input/output (I/O) controller, a hard disk, a camera interface, an input interface, a light emission interface, a communication interface, and a memory card interface. These components are connected such that they can perform data communication centering around the system controller.

C. Example of Configuration of Illumination Device

Figure 4:
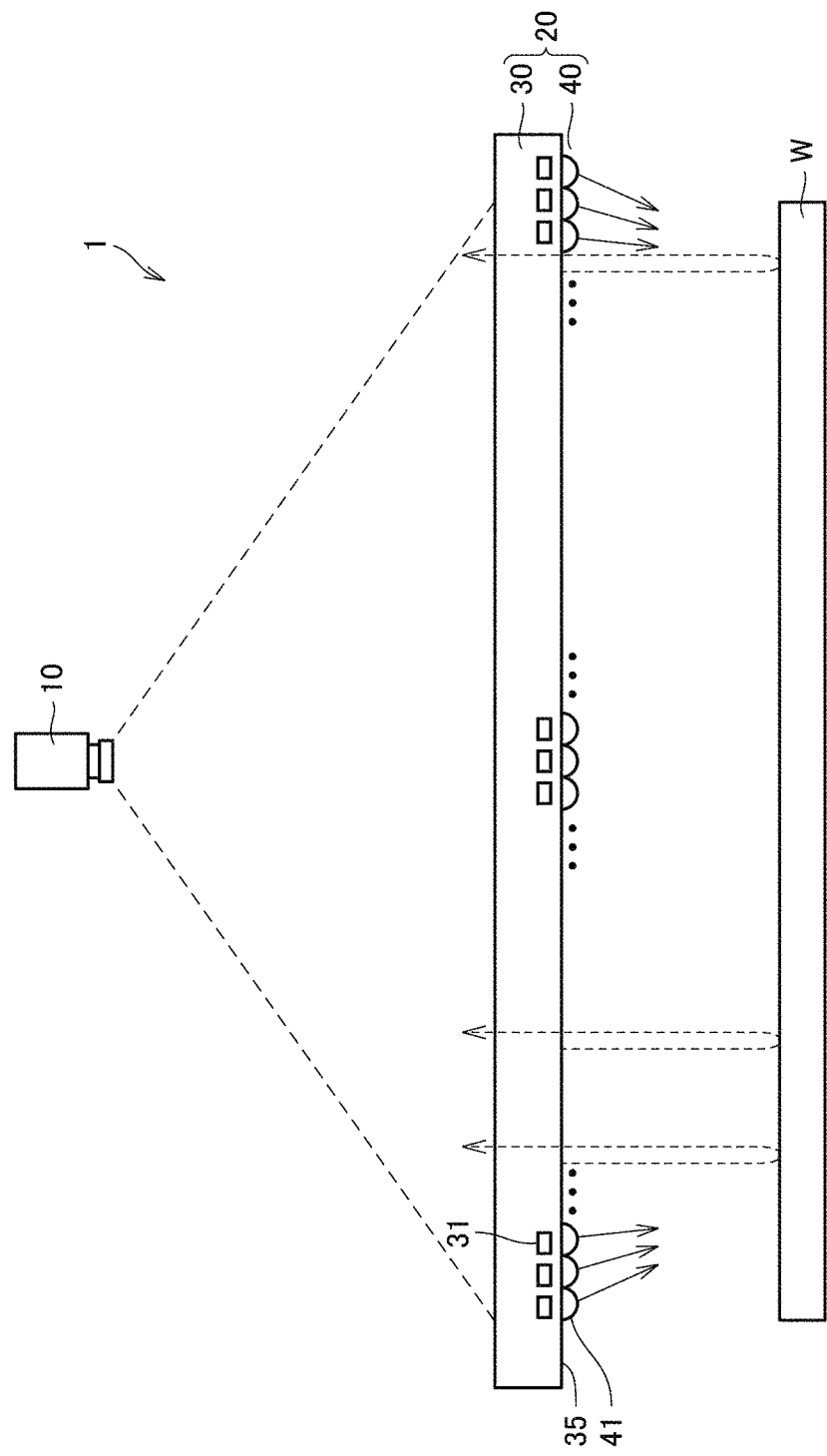
FIG. 4 is a diagram schematically showing a configuration of an illumination device included in the image inspection apparatus.

FIG. 4 is a diagram schematically showing a configuration of the illumination device included in the image inspection apparatus 1. The illumination device 20 is disposed between a workpiece W and the camera 10, radiates light to the workpiece W and has translucency. Accordingly, light radiated from the illumination device 20 is reflected by the workpiece W, is transmitted by the illumination device 20 and arrives at the camera 10.

The illumination device 20 includes a surface light source 30 and a micro-lens array 40 which is an example of an optical system. The surface light source 30 radiates light to the workpiece W from a light-emitting surface 35 at the side of the workpiece W. Light is radiated from a plurality of light-emitting regions arranged in a matrix form on the light-emitting surface 35 of the surface light source 30. Reflected light from the workpiece W is transmitted by a light-transmitting region other than the light-emitting regions in the surface light source 30.

Each light-emitting region includes a light-emitting unit 31. As an example, the light-emitting unit 31 includes a member configured according to organic electroluminescence (hereinafter referred to as organic EL). A plurality of light-emitting units 31 are configured to be able to selectively emit light. A light-emitting unit 31 to emit light is selected by the control device 100 (refer to FIG. 1). As an example, the surface light source 30 is a light source using organic EL. However, any illumination device having translucency and a plurality of light-emitting units arranged in a matrix form and configured to selectively emit light is applicable to the present embodiment. That is, the illumination device 20 applicable to the present embodiment is not limited to a light source using organic EL.

The micro-lens array 40 is disposed to face the light-emitting surface 35 of the surface light source 30. The micro-lens array 40 includes a plurality of lenses 41 provided to face the plurality of light-emitting units 31. In an example, the lenses 41 are convex lenses. The lenses 41 are configured to guide light emitted from the light-emitting units 31 corresponding thereto in a desired direction. That is, the micro-lens array 40 is configured to control a radiation direction of light emitted from each of the plurality of light-emitting units 31 to be a direction corresponding to the position of each light-emitting unit 31.

A radiation solid angle may be arbitrarily changed by selecting a light-emitting unit to emit light from the plurality of light-emitting units 31. A light-emitting unit to emit light is selected according to a place of a visual field. Accordingly, it is possible to realize the image inspection apparatus 1 capable of arbitrarily setting a radiation solid angle for each place of a visual field. Further, since the radiation solid angle can be arbitrarily changed, an optical part such as a slit or a half mirror, for example, can be unnecessary. Accordingly, the illumination device 20 can be reduced in size. Therefore, it is possible to realize the image inspection apparatus 1 which can set a radiation solid angle for each place of a visual field and can be reduced in size.

Figure 5:
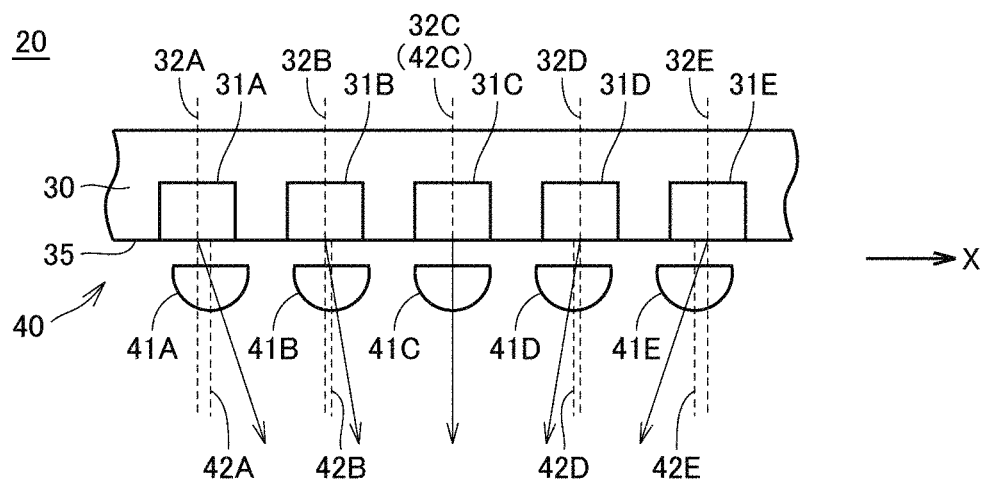
FIG. 5 is a schematic diagram showing a cross section of a part of an example of an illumination device according to the present embodiment.
Figure 6:
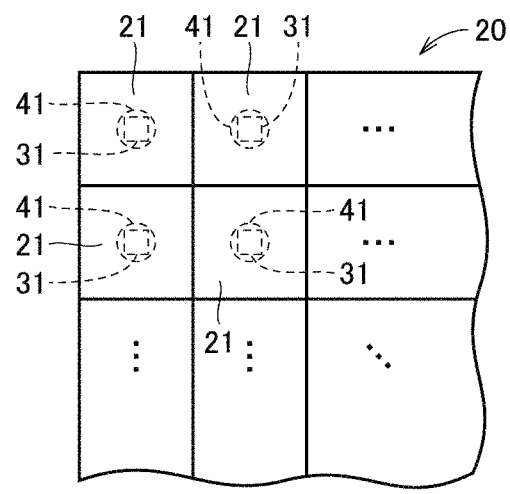
FIG. 6 is an enlarged schematic plan view of a part of the illumination device according to the present embodiment.

An example of the configuration of the illumination device according to the present embodiment will be described with reference to FIGS. 5 and 6. FIG. 5 is a schematic diagram showing a cross section of a part of an example of the illumination device according to the present embodiment. FIG. 6 is an enlarged schematic plan view of a part of the illumination device according to the present embodiment.

The illumination device 20 is a transmission type sheet illumination device and includes the surface light source 30 and the micro-lens array 40. The surface light source 30 is a light source using organic EL. The surface light source 30 includes a plurality of light-emitting units arranged in a matrix form along the light-emitting surface 35. FIG. 5 representatively shows light-emitting units 31A to 31E.

Each of the light-emitting units 31A to 31E has a pair of electrodes (not shown) facing each other. When a voltage is applied across the pair of electrodes, the light-emitting unit emits light. A light-emitting unit to emit light may be selected by selecting an electrode pair to which a voltage will be applied from a plurality of electrode pairs. The color of light emitted from each of the light-emitting units 31A to 31E is not limited. For example, the plurality of light-emitting units 31 may emit light in the same color. Alternatively, light-emitting units capable of emitting light in different colors may be realized by combining a light-emitting unit which emits red light, a light-emitting unit which emits green light and a light-emitting unit which emits blue light.

The micro-lens array 40 includes a plurality of lenses 41 which are a plurality of micro-lenses arranged to face the plurality of light-emitting units 31. The plurality of lenses 41 are arranged in a matrix form along the light-emitting surface 35. FIG. 5 representatively shows lenses 41A to 41E facing the light-emitting units 31A to 31E. In an example, the lenses 41A to 41E are planoconvex lenses. The surfaces of the planoconvex lenses face the light-emitting surface 35. For example, the planoconvex lenses may be hemispherical lenses.

Each lens is for controlling a radiation direction of light emitted from the corresponding light-emitting unit. In an embodiment, in the lenses 41A to 41E, relative positions of the optical axes of the lenses with respect to the optical axes of light-emitting units are different. The direction of light emitted from a lens is determined according to a direction of deviation of the optical axis of the lens with respect to the optical axis of the corresponding light-emitting unit and a deviation amount. Meanwhile, in this embodiment, the optical axis of a light-emitting unit refers to an axis which penetrates the center point of a light-emitting region and is perpendicular to the light-emitting region and the optical axis of a lens refers to an axis which penetrates the center of the lens and is perpendicular to the principal plane of the lens. "Deviation amount" refers to a magnitude of deviation of the optical axis of a lens with respect to the optical axis of a light-emitting unit.

The optical axis 32C of the light-emitting unit 31C and the optical axis 42C of the lens 41C are substantially consistent with each other. The optical axis 42A of the lens 41A deviates from the optical axis 32A of the light-emitting unit 31A to the right on the paper (in the +X direction). Similarly, the optical axis 42B of the lens 41B also deviates from the optical axis 32B of the light-emitting unit 31B in the +X direction. A deviation amount with respect to the pair of the light-emitting unit 31A and the lens 41A is greater than that with respect to the pair of the light-emitting unit 31B and the lens 41B.

On the other hand, the optical axis 42D of the lens 41D deviates from the optical axis 32D of the light-emitting unit 31D to the left on the paper (in the −X direction). Similarly, the optical axis 42E of the lens 41E also deviates from the optical axis 32E of the light-emitting unit 31E in the −X direction. A deviation amount with respect to the pair of the light-emitting unit 31E and the lens 41E is greater than that with respect to the pair of the light-emitting unit 31D and the lens 41D.

As is understood from FIG. 5, it is possible to change a radiation solid angle by selectively causing any of the light-emitting units 31A to 31E shown in FIG. 5 to emit light. Since the radiation solid angle may be varied, restrictions on illumination patterns of the illumination device 20 are mitigated. In other words, it is possible to realize illumination based on an arbitrary pattern according to the illumination device 20.

As shown in FIG. 6, the illumination device 20 includes a plurality of illumination elements 21 arranged in a matrix form. That is, the illumination device 20 is sectioned into the plurality of illumination elements 21. Each illumination element 21 includes a plurality of light-emitting units 31 and a plurality of lenses 41. For example, each illumination element 21 may include the light-emitting units 31A to 31E and the lenses 41A to 41E shown in FIG. 5. FIG. 6 shows a single light-emitting unit 31 and a single lens 41 corresponding thereto included in each illumination element 21 for illustration.

Each illumination element 21 includes a light-emitting region and a transparent region. It is possible to cause the entire illumination element 21 to emit light by causing the transparent region to emit light. Meanwhile, each illumination element 21 has translucency by including the transparent region.

The illumination device 20 may independently turn on the plurality of illumination elements 21. An illumination pattern of the illumination device 20 is determined by illumination elements 21 including light-emitting units 31 to emit light (i.e., illumination elements 21 to be turned on) among the plurality of illumination elements 21. In the illumination device 20 capable of changing the wavelength of light radiated from each illumination element 21, an illumination pattern may be determined by illumination elements 21 which are turned on among the plurality of illumination elements 21 and the wavelength of light radiated from each illumination element 21 which is turned on.

Figure 7:
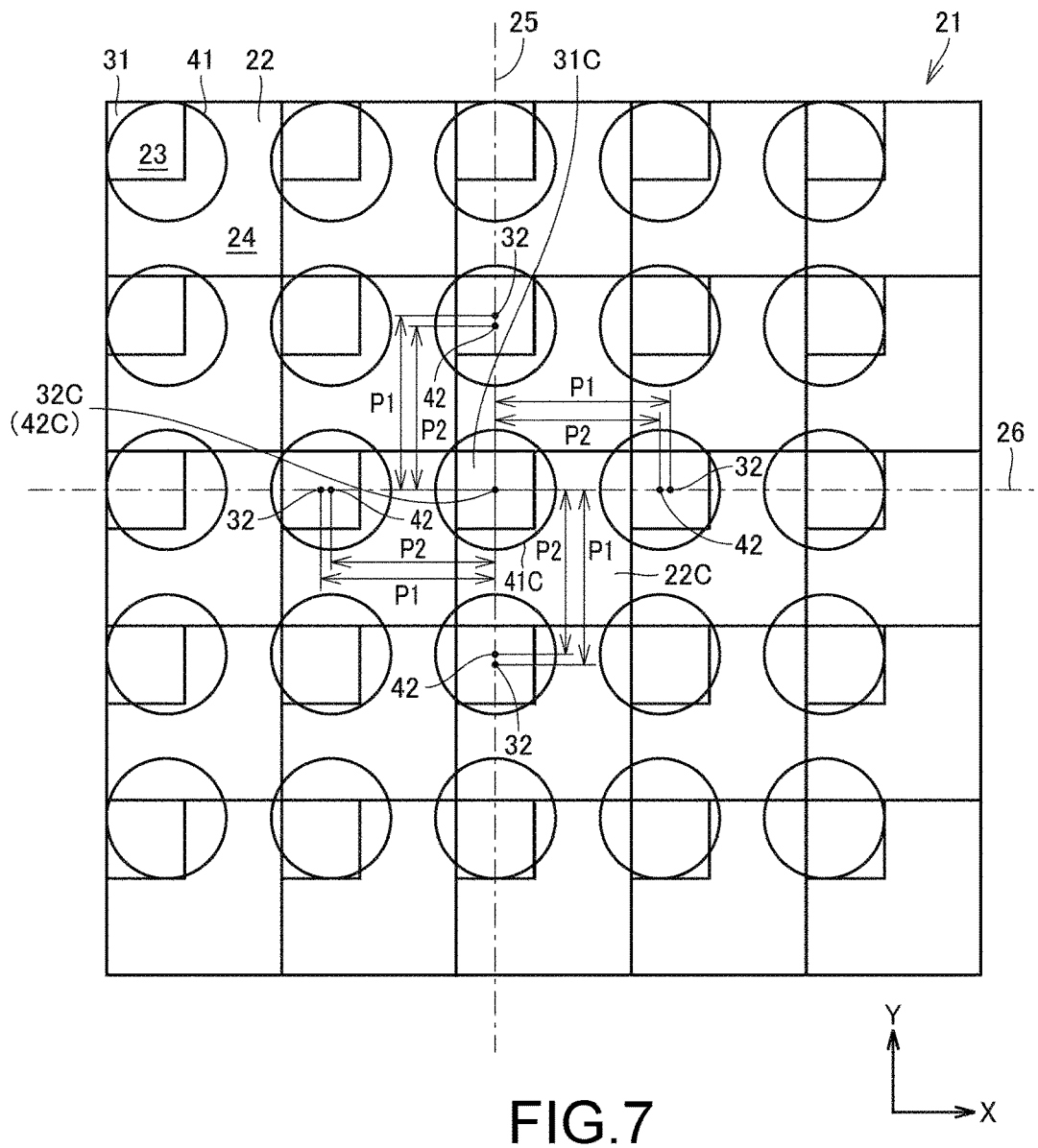
FIG. 7 is a plan view schematically showing an example of a structure of an illumination element which is a component of the illumination device.

FIG. 7 is a plan view schematically showing an example of a structure of an illumination element which is a component of the illumination device 20. FIG. 7 shows a planar view of the illumination element at the side of the image capturing unit (above the illumination device 20).

The illumination element 21 includes a plurality of cells 22 arranged in a matrix form. In the following description, "row" refers to an X direction and "column" refers to a Y direction. FIG. 7 shows the illumination element 21 composed of 25 cells 22 arranged in 5 rows and 5 columns (=5×5). However, the number of cells constituting the illumination element 21 is not particularly limited. For example, the illumination element 21 may be composed of 121 cells 22 arranged in 11 rows and 11 columns (=11×11). As the number of cells 22 increases, the resolution of a radiation direction of the illumination element 21 can increase but the resolution of a light-emitting position decreases. The number of cells 22 constituting the illumination element 21 can be determined by the resolution of a radiation direction and the resolution of a light-emitting position.

Each cell 22 includes a light-emitting unit 31, a lens 41 and a transparent region 24. A light-emitting surface of the light-emitting unit 31 constitutes a light-emitting region in the cell 22.

A plurality of light-emitting units 31 are arranged at a first pitch P1 in the X direction and the Y direction. A plurality of lenses 41 are arranged at a second pitch P2 in the X direction and the Y direction. Since the second pitch P2 is less than the first pitch P1 (P2<P1), a deviation amount in the X direction between the optical axis 32 of the light-emitting unit 31 and the optical axis 42 of the lens 41 conforms to an arithmetic progression of a tolerance (P1−P2) with respect to a plurality of cells 22 aligned in the X direction (row direction). Similarly, a deviation amount in the Y direction between the optical axis 32 of the light-emitting unit 31 and the optical axis 42 of the lens 41 conforms to the arithmetic progression of the tolerance (P1−P2) with respect to a plurality of cells 22 aligned in the Y direction (column direction).

The plurality of light-emitting units 31 and the plurality of lenses 41 are arranged symmetrically with respect to both the X axis and the Y axis. To explain this, axes 25 and 26 of symmetry are shown in FIG. 7. The axis 25 of symmetry is an axis for representing that the plurality of light-emitting units 31 and the plurality of lenses 41 are arranged symmetrically with respect to the X axis and is parallel with the Y direction. The axis 26 of symmetry is an axis for representing that the plurality of light-emitting units 31 and the plurality of lenses 41 are arranged symmetrically with respect to the Y axis and is parallel with the X direction.

In FIG. 7, a cell 22C is a cell positioned at the center of the illumination element 21. The cell 22C includes a light-emitting unit 31C and a lens 41C. The optical axis 32C of the light-emitting unit 31C and the optical axis 42C of the lens 41C overlap in the planar view. That is, both a deviation amount in the X direction and a deviation amount in the Y direction are 0 between the optical axis 32C and the optical axis 42C. Meanwhile, the optical axes 32C and 42C are positioned at the intersection of the axes 25 and 26 of symmetry.

In each cell in the illumination element 21, a deviation amount in the X direction and a deviation amount in the Y direction between the optical axis 32 of the light-emitting unit 31 and the optical axis 42 of the lens 41 are determined according to a distance in the X direction and a distance in the Y direction between the cell and the central cell 22C. Accordingly, it is possible to make a radiation direction of light different for the respective cells 22. The illumination element 21 may radiate light to a workpiece in a plurality of directions. Further, a radiation direction of light from the illumination element 21 may be controlled by selecting a cell to be turned on from the plurality of cells.

In the structure shown in FIG. 7, the pitch of the light-emitting units 31 is the same as the pitch of the lenses 41 in the X direction and the Y direction. However, the pitch of the light-emitting units 31 may be different in the X direction and the Y direction. Similarly, the pitch of the lenses 41 may be different in the X direction and the Y direction.

Figure 8:
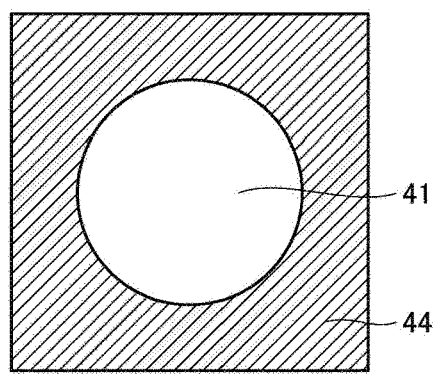
FIG. 8 is a schematic plan view showing a configuration for a countermeasure against light leaking from the edge of a lens.
Figure 9:
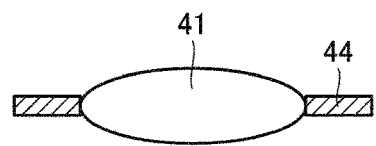
FIG. 9 is a schematic cross-sectional view of the configuration shown in FIG. 8.

When a deviation amount (displacement amount) of the optical axis 42 of the lens 41 with respect to the optical axis 32 of the light-emitting unit 31 is large, there is the possibility of a part of light emitted from the light-emitting unit 31 leaking from the edge of the lens 41. FIG. 8 is a schematic plan view showing a configuration for a countermeasure against light leaking from the edge of the lens 41. FIG. 9 is a schematic cross-sectional view of the configuration shown in FIG. 8. As shown in FIGS. 8 and 9, a light-shielding part 44 may be provided to surround the edge of the lens 41. The light-shielding part 44 is formed of a material which does not pass light or a material which attenuates light. The possibility of light from the light-emitting unit 31 leaking in an unintended direction can be reduced according to the light-shielding part 44.

Figure 10:
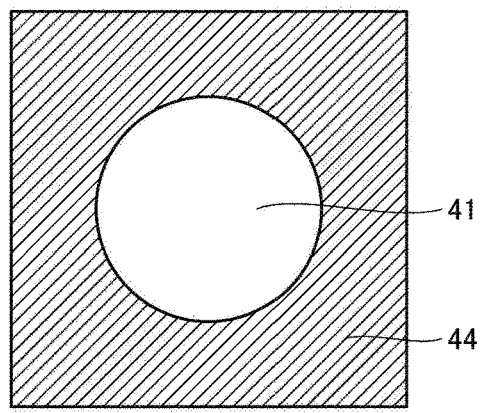
FIG. 10 is a schematic plan view showing a modified example of the configuration shown in FIG. 8.

FIG. 10 is a schematic plan view showing a modified example of the configuration shown in FIG. 8. In the example shown in FIG. 10, the area of the light-shielding part 44 is larger than that in the configuration shown in FIG. 8. Accordingly, the possibility of light from the light-emitting unit 31 leaking in an unintended direction can be further reduced.

Figure 11:
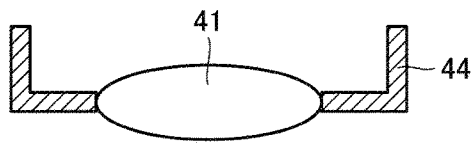
FIG. 11 is a schematic cross-sectional view showing another modified example of the configuration shown in FIG. 8.

FIG. 11 is a schematic cross-sectional view showing another modified example of the configuration shown in FIG. 8. In the example shown in FIG. 11, the light-shielding part 44 has a configuration of surrounding the edge of the lens 41 with a sufficient height in the direction of the height (thickness) of the lens 41 in addition to the configuration shown in FIG. 10. According to the configuration shown in FIG. 10, the effect of reducing light leaking from the edge of the lens 41 can be further improved.

D. Embodiment 1

In embodiment 1, the surface of a workpiece is inspected using a light sectioning method. The illumination device 20 radiates light in a line form to a workpiece W in a certain direction and causes the light to scan. The camera 10 captures images of the workpiece W multiple times while the light is caused to scan to generate a plurality of captured images. As described above, light scanning is performed twice.

Figure 12:
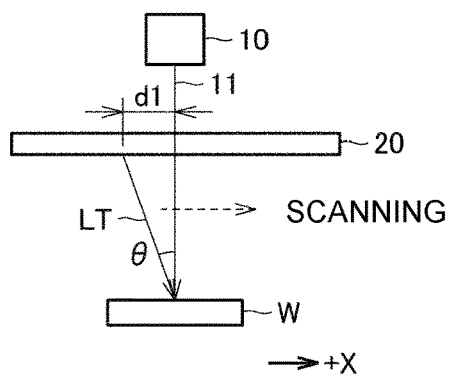
FIG. 12 is a diagram for describing first scanning of light when a light sectioning method is performed.
Figure 13:
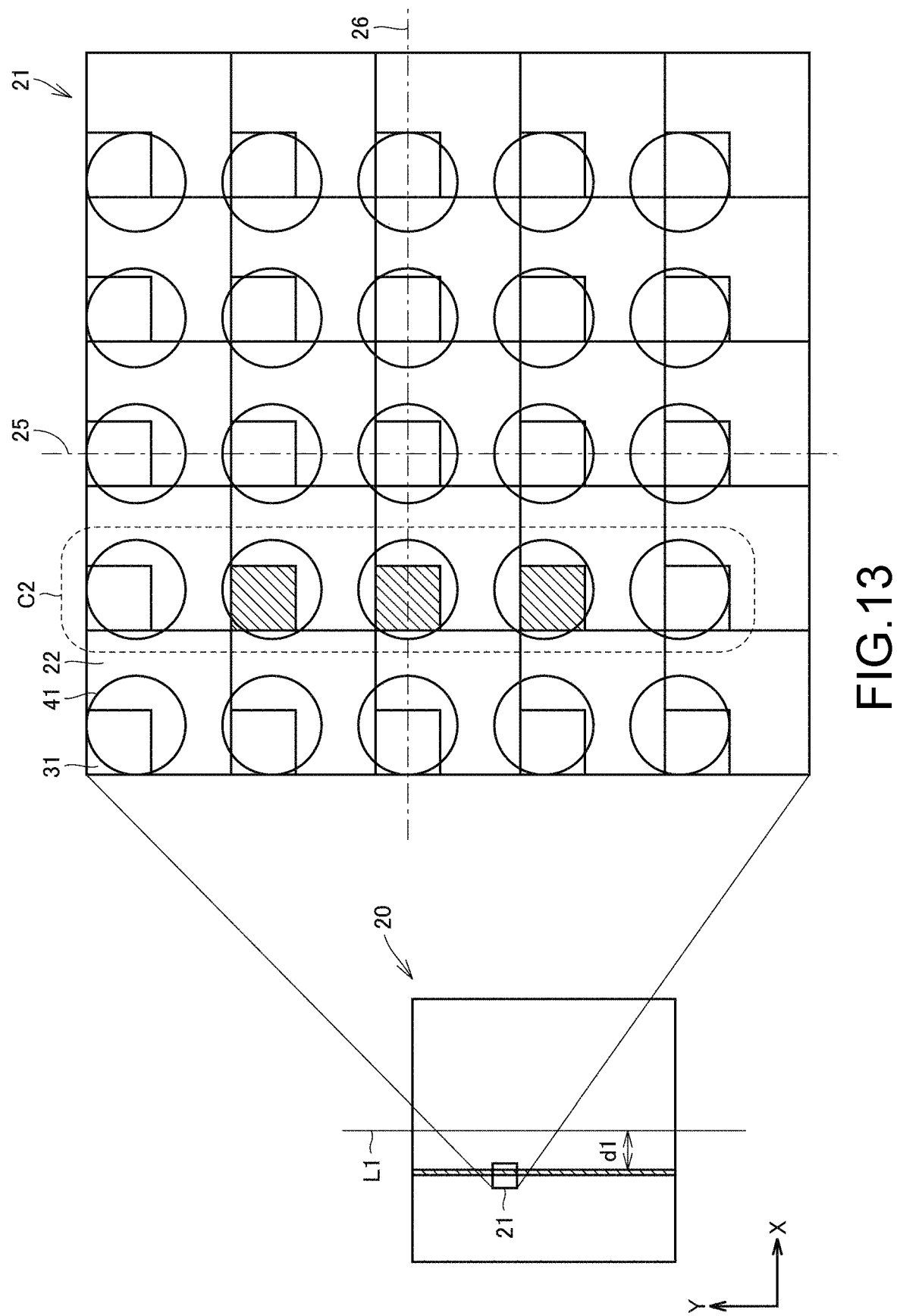
FIG. 13 is a diagram for describing an illumination pattern of an illumination device for radiation of light shown in FIG. 12.

FIG. 12 is a diagram for describing first scanning of light when the light sectioning method is performed. FIG. 13 is a diagram for describing an illumination pattern of the illumination device for radiation light shown in FIG. 12. The configuration of the illumination element 21 shown in FIG. 13 and figures which will be described below is basically the same as the configuration shown in FIG. 5, and thus detailed description thereof will not be repeated. Meanwhile, in the figures which will be described below, a region emitting light in the illumination device 20 and a light-emitting unit emitting light in an illumination element are represented by hatching.

As shown in FIG. 12, the illumination device 20 radiates light LT in a line form to a workpiece W in a direction that forms an angle θ with respect to the optical axis 11 of the camera 10 and causes the light LT to scan in the +X direction. While the light LT scans, the camera 10 captures images of the surface of the workpiece W multiple times. Accordingly, a plurality of captured images are acquired.

FIG. 13 shows a state of the illumination device 20 during scanning of light. A straight line L1 shown in FIG. 13 is a virtual straight light for representing X coordinates of the optical axis of the camera 10 and is a straight line parallel with the Y axis. The illumination device 20 turns on a plurality of illumination elements 21 aligned in the Y direction. As an example, FIG. 13 shows a state in which a plurality of illumination elements 21 positioned in the −X direction and separated from the straight line L1 by a distance d1 are turned on. To radiate light to a workpiece W in a predetermined direction, three light-emitting units 31 arranged in a specific column (e.g., column C2) emit light in each illumination element 21. Accordingly, the illumination device 20 is able to radiate light in a line form in the Y direction to a desired place of the surface of the workpiece W in a direction at an angle θ to the optical axis 11 of the camera 10.

Figure 14:
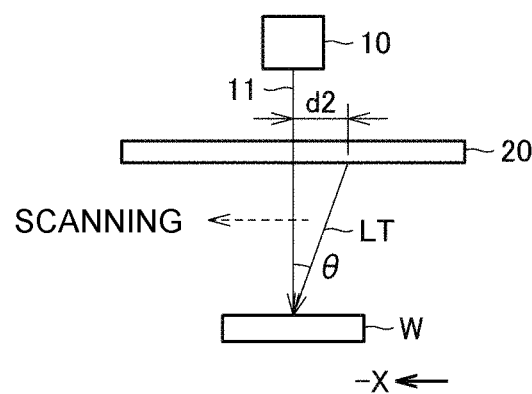
FIG. 14 is a diagram for describing second scanning of light when the light sectioning method is performed.
Figure 15:
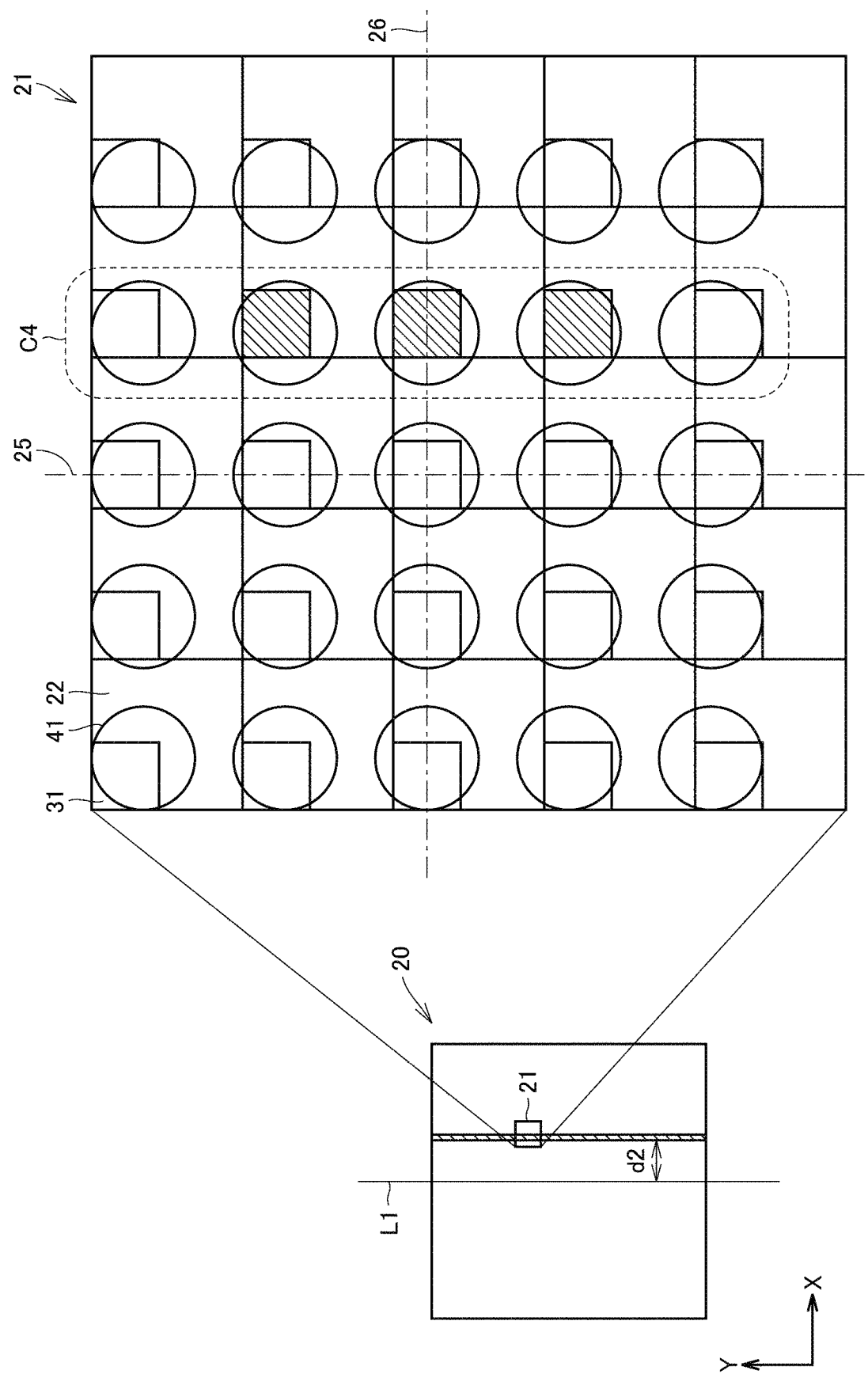
FIG. 15 is a diagram for describing an illumination pattern of the illumination device for radiation of light shown in FIG. 14.

FIG. 14 is a diagram for describing second scanning of light when the light sectioning method is performed. FIG. 15 is a diagram for describing an illumination pattern of the illumination device for radiation of light shown in FIG. 14. As shown in FIG. 14, in the second scanning, the illumination device 20 radiates the light LT in a line form to the workpiece W in a reverse direction of the light radiation direction in the first scanning. The direction in which the light is radiated is at an angle θ to the optical axis 11 of the camera 10.

The illumination device 20 causes the light LT to scan in the −X direction, for example. However, the illumination device 20 may cause the light LT to scan in the +X direction as in the first scanning. While the light LT scans, the camera 10 captures images of the surface of the workpiece W. Accordingly, a plurality of captured images are acquired.

As an example, FIG. 15 shows a state in which a plurality of illumination elements 21 positioned in the +X direction and separated from the straight line L1 by a distance d2 are turned on. In each of the plurality of illumination elements 21, three light-emitting units 31 arranged in a specific column (e.g., column C4) emit light. As is understood from comparison between FIG. 13 and FIG. 15, the light-emitting units 31 and the lenses 41 are arranged symmetrically with respect to the axis 25 of symmetry when the column C2 and the column C4 are compared with each other. Accordingly, the illumination device 20 is able to radiate light in a line form in the Y direction to a desired place of the surface of the workpiece W in a direction which is reverse to the light radiation direction in the first scanning and forms the angle θ to the optical axis 11 of the camera 10.

Figure 16:
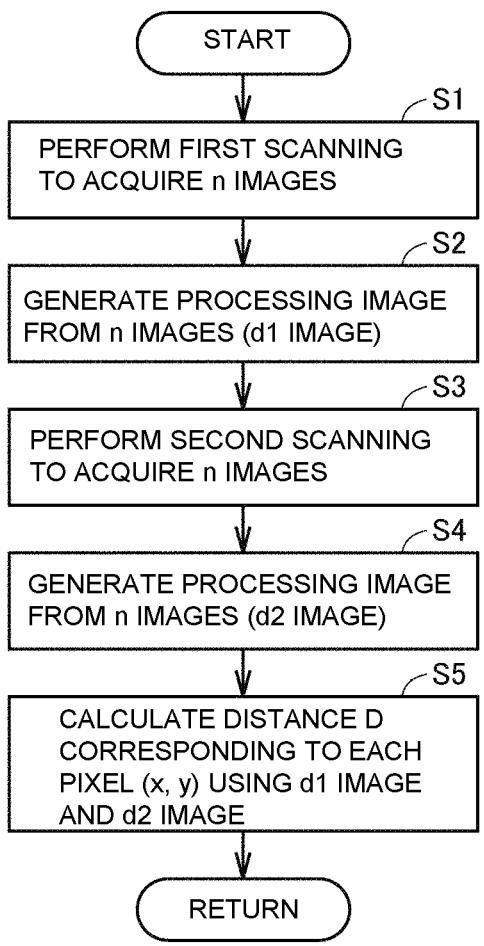
FIG. 16 is a flowchart showing a distance calculation method included in an inspection method according to embodiment 1.

FIG. 16 is a flowchart showing a distance calculation method included in an inspection method according to embodiment 1. The distance calculation method according to embodiment 1 will be described below with reference to FIGS. 2 and 16. In step S1, the illumination device 20 performs first scanning of light and the camera 10 captures images of a workpiece W n times (n is an integer equal to or greater than 2). Accordingly, n images (n captured images 3) are acquired.

In step S2, the control device 100 generates the processing image 4 from the n images acquired through the process of step S1. Specifically, the control device 100 identifies a pixel having a maximum luminance from the n captured images for each pixel position (x, y). In addition, the control device 100 includes a distance d1 (refer to FIGS. 12 and 13) when the images are acquired in information on the pixel. The distance d1 represents a first light-emitting position of the illumination device 20 when the luminance of a pixel (pixel at the pixel position (x, y)) corresponding to a measurement point on the surface of the workpiece W is maximized. Each pixel in the processing image 4 has information on the distance d1 which gives a highest luminance value as a pixel value. Meanwhile, the processing image 4 is referred to as "d1 image" in FIG. 16.

In step S3, the illumination device 20 performs second scanning of light and the camera 10 captures images of the workpiece W n times. Accordingly n images are acquired. In step S4, the control device 100 generates the processing image 6 from the n images (n captured images 5) acquired through the process of step S3.

In step S4, the control device 100 generates the processing image 6 from the n images (n captured images 5) acquired through the process of step S3. As in the process of step S2, the control device 100 identifies a pixel having a maximum luminance from the n captured images for each pixel position (x, y). In addition, the control device 100 includes a distance d2 (refer to FIGS. 14 and 15) when the images are acquired in pixel information. The distance d2 represents a second light-emitting position of the illumination device 20 when the luminance of the pixel (pixel at the pixel position (x, y)) corresponding to the measurement point on the surface of the workpiece W is maximized. Each pixel in the processing image 6 has information on the distance d2 which gives a highest luminance value as a pixel value. Meanwhile, the processing image 6 is referred to as "d2 image" in FIG. 16.

In step S5, the control device 100 calculates a distance D corresponding to a pixel of each coordinates (x, y) using the d1 image (processing image 4) and the d2 image (processing image 6). The distance D is a distance between the light-emitting surface 35 of the illumination device 20 and the measurement point on the surface of the workpiece W corresponding to the pixel of the coordinates (x, y).

Figure 17:
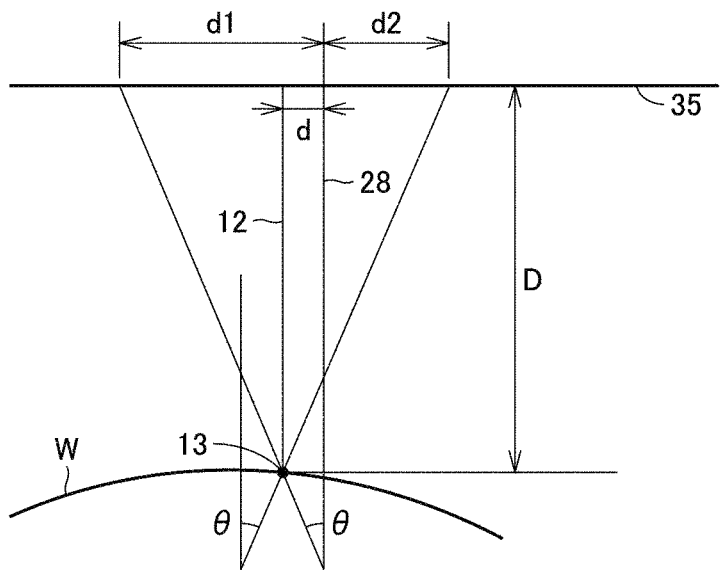
FIG. 17 is a diagram describing the principle of the distance calculation method according to embodiment 1.

FIG. 17 is a diagram describing the principle of the distance calculation method according to embodiment 1. In FIG. 17, a measurement point 13 corresponds to a position on the surface of the workpiece W corresponding to the pixel of the coordinates (x, y). The pixel PX1 in the processing image 4 (d1 image) and the pixel PX2 in the processing image 6 (d2 image) are pixels corresponding to the measurement point 13.

A straight line 12 penetrates the measurement point 13 and is parallel with a central line 28 (a straight line which penetrates the center of the light-emitting surface 35 and is perpendicular to the light-emitting surface 35) of the illumination device 20. When a distance between the central line 28 of the illumination device 20 and the straight line 12 is set to d, the following equations (1) and (2) are established.

$$(d1-d) = D \times \tan \theta \quad (1)$$

$$(d2+d) = D \times \tan \theta \quad (2)$$

When d is eliminated from the equations (1) and (2), the following equation (3) is established.

$$(d1+d2) = 2D \times \tan \theta \quad (3)$$

When the equation (3) is modified, the following equation (4) is derived.

$$D = (d1+d2)/(2 \times \tan \theta) \quad (4)$$

θ is an emission direction of light from the illumination device 20. The control device 100 controls a direction in which light is emitted from the illumination device 20 by controlling the illumination device 20. Accordingly, the control device 100 can be aware of the value of the angle θ.

The distances d1 and d2 are information included in the pixels of the processing image 4 and the pixels of the processing image 6 and are determined according to conditions of scanning of light performed by the illumination device 20.

Since the equation (4) does not include the distance d, the equation (4) is established with respect to an arbitrary position on the surface of the workpiece W. It is possible to calculate the distance D between the light-emitting surface 35 of the illumination device 20 and an arbitrary position on the surface of the workpiece W on the basis of the distance d1 (first light-emitting position), the distance d2 (second light-emitting position) and the angle θ (radiation direction of light) by using the equation (4).

The distances d1 and d2 are distances from the center of the light-emitting surface 35. Since the plurality of illumination elements 21 are arranged in a matrix form, the distances d1 and d2 can be determined. Accordingly, it is possible to perform inspection of an object without a necessity for calibration between the image capturing unit and the illumination device.

When an illumination pattern is scanned, a range of one edge to the other edge of a light-emitting region in the light-emitting surface may be scanned (whole scanning). However, when a place at which a distance is desired to be obtained is limited, the scanning range may be limited.

When the angle θ is small, the accuracy of a distance decreases whereas a risk of occlusion (shielding) is small according to the principle of triangulation. Conversely, when the value of the angle θ is large, the accuracy of a distance increases but a risk of occlusion is large. Accordingly, the value of the angle θ which determines a radiation direction of light may be varied according to the shape of a workpiece W. A plurality of trials may be performed while changing the value of the angle θ and results may be integrated.

Although the scanning direction is the X direction in the above description, scanning in the Y direction may be performed. In the above description, the X direction (X axis) may be substituted by the Y direction (Y axis) and the axis 25 of symmetry may be substituted by the axis 26 of symmetry. Measurement according to scanning in the X direction and measurement according to scanning in the Y direction may be tried and results thereof may be integrated.

Further, three of the five light-emitting units 31 included in one column of the illumination element 21 are turned on in the above-described description. However, all of the (5) light-emitting units 31 included in one column may be caused to emit light. Alternatively, only one light-emitting unit 31 positioned at the center of one column may be caused to emit light.

E. Embodiment 2

In embodiment 2, the surface of a workpiece is inspected using a phase shift method. The illumination device 20 radiates light in a striped pattern to a workpiece W in a certain direction and causes the light to scan. The camera 10 captures images of the workpiece W multiple times while the light is caused to scan to generate a plurality of captured images. As in embodiment 1, light scanning is performed twice.

Figure 18:
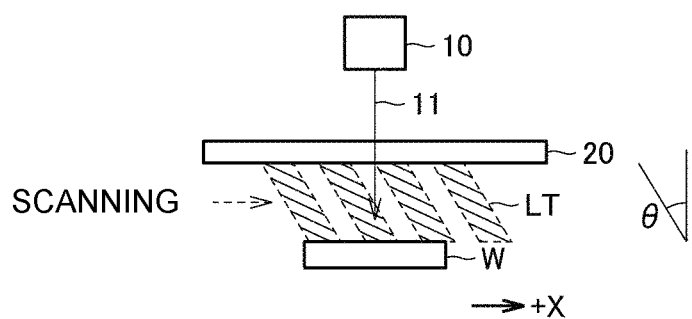
FIG. 18 is a diagram for describing first scanning of light when a phase shift method is performed.
Figure 19:
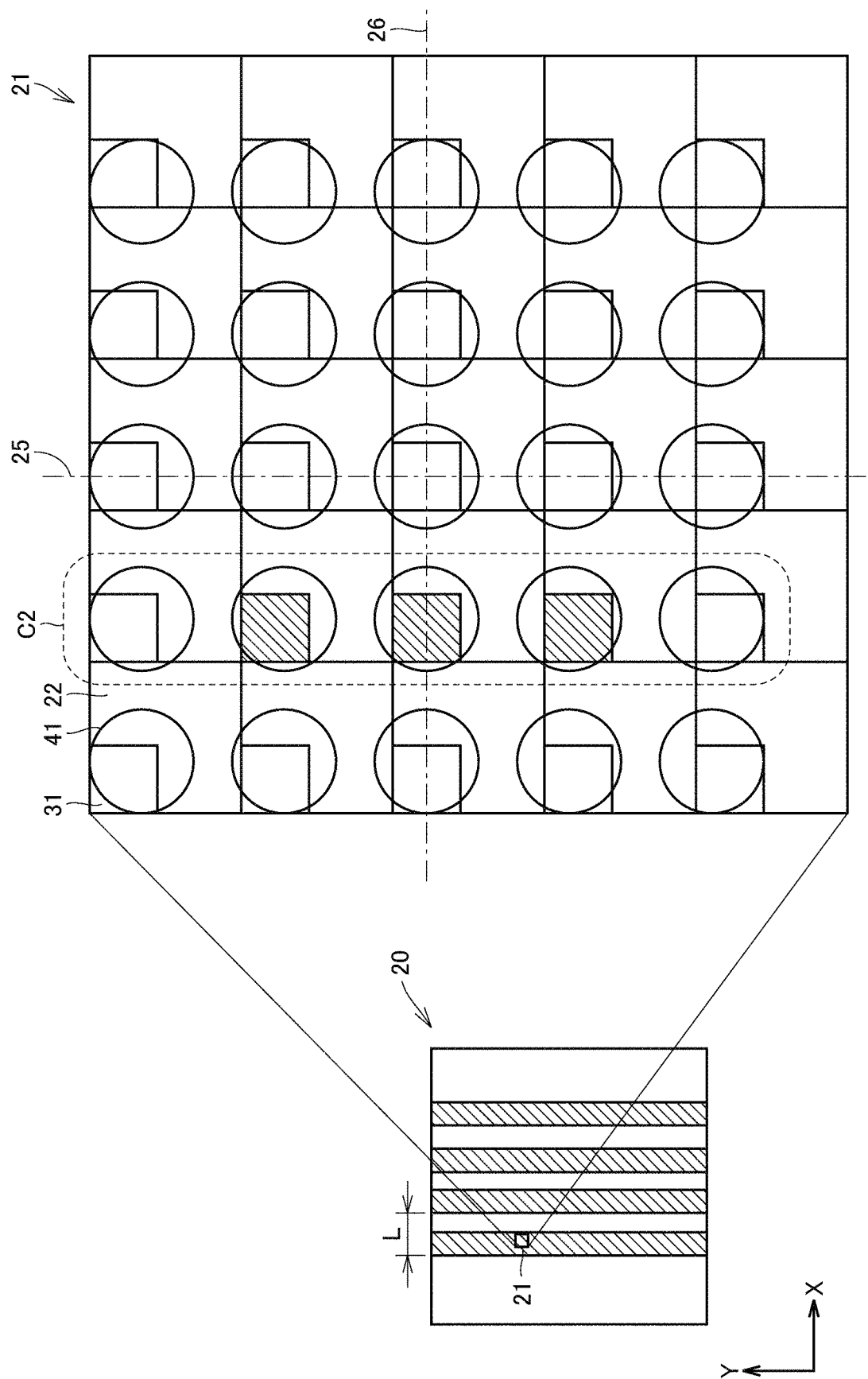
FIG. 19 is a diagram for describing an illumination pattern of the illumination device for radiation of light shown in FIG. 18.

FIG. 18 is a diagram for describing first scanning of light when the phase shift method is performed. FIG. 19 is a diagram for describing an illumination pattern of the illumination device for radiation of light shown in FIG. 18. As shown in FIG. 18, the illumination device 20 radiates light LT to a workpiece W in a direction that forms an angle θ with respect to the optical axis 11 of the camera 10. The camera 10 captures images of the surface of the workpiece W. The illumination device 20 radiates a light in a striped pattern (light-and-shade pattern) to the workpiece W while changing the phase of the striped pattern. Accordingly, a state equivalent to scanning of light in a striped pattern on the surface of the workpiece W may be generated. Since the illumination pattern is a periodic pattern, the illumination device 20 may change the phase by one period. In the example shown in FIG. 18, the illumination pattern is scanned in the +X direction.

As shown in FIG. 19, the illumination device 20 turns on illumination elements 21 in a plurality of columns such that light and shade are alternately generated in the X direction. L represents a length corresponding to the period of the striped pattern. Further, the illumination device 20 may be controlled such that the intensity of light emission changes according to a sine wave. To radiate light to the workpiece W in a predetermined direction, three light-emitting units 31 arranged in a specific column (e.g., column C2) emit light in each of the plurality of illumination elements 21.

Figure 20:
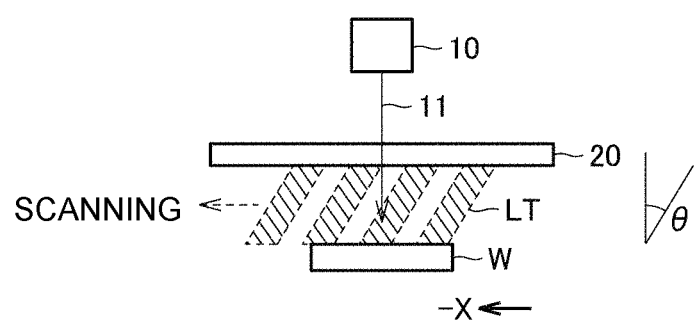
FIG. 20 is a diagram for describing second scanning of light when the phase shift method is performed.
Figure 21:
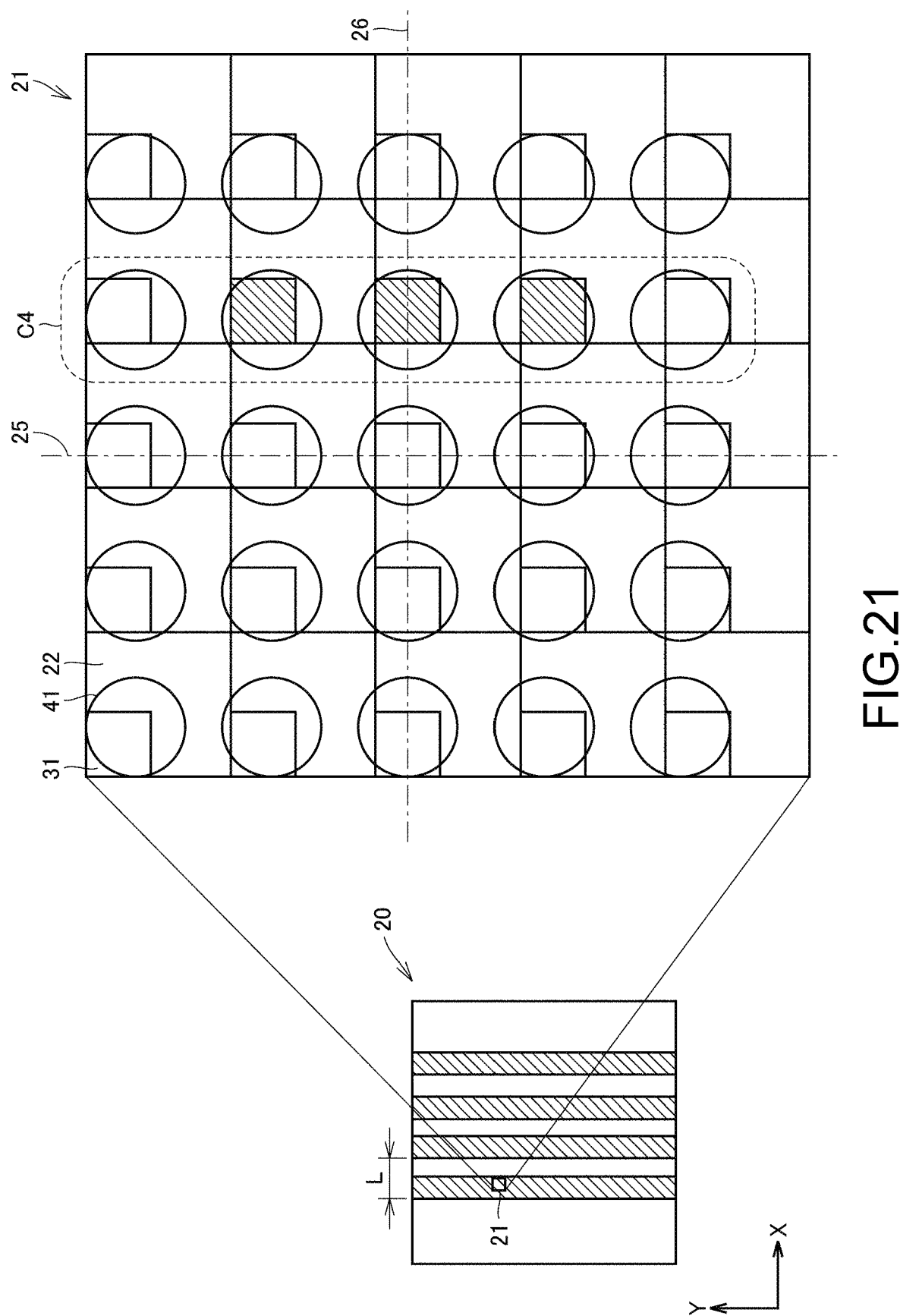
FIG. 21 is a diagram for describing an illumination pattern of the illumination device for radiation of light shown in FIG. 20.

FIG. 20 is a diagram for describing second scanning of light when the phase shift method is performed. FIG. 21 is a diagram for describing an illumination pattern of the illumination device for radiation of light shown in FIG. 20. As shown in FIG. 20, in the second scanning, the illumination device 20 radiates light LT to the workpiece W in a direction reverse to the radiation direction of light in the first scanning. A direction in which light is radiated forms an angle θ to the optical axis of the camera 10.

The illumination device 20 causes the light LT to scan in the −X direction, for example. However, the illumination device 20 may cause the light LT to scan in the +X direction as in the first scanning. The camera 10 captures images of the surface of the workpiece W multiple times while the light LT is caused to scan.

As an example, three light-emitting units 31 arranged in a specific column (e.g., column C4) emit light in each of the plurality of illumination elements 21. As in the example in embodiment 1, the illumination device 20 can radiate light in a direction which is reverse to the radiation direction of light in the first scanning and forms the angle θ to the optical axis 11 of the camera 10.

Figure 22:
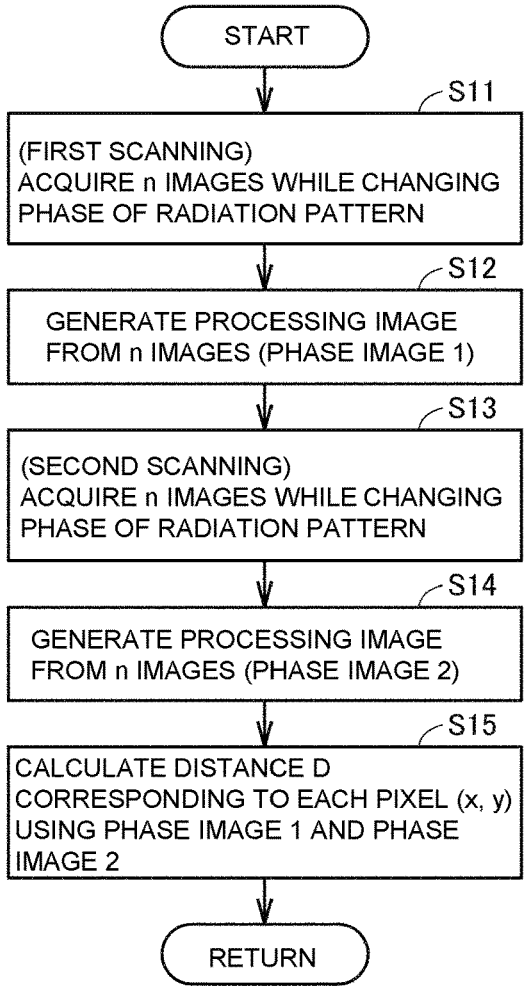
FIG. 22 is a flowchart showing a distance calculation method included in an inspection method according to embodiment 2.

FIG. 22 is a flowchart showing a distance calculation method included in an inspection method according to embodiment 2. The distance calculation method according to embodiment 2 will be described below with reference to FIGS. 2 and 22. In step S11, the illumination device 20 performs first scanning of light. That is, the illumination device 20 changes the phase of an illumination pattern by one period, for example. A change amount of the phase is not particularly limited. The camera 10 captures images of the workpiece W n times (n is an integer equal to or greater than 2). Accordingly, n images are acquired.

In step S12, the control device 100 generates the processing image 4 having a phase a of the illumination pattern (striped pattern) as a pixel value from the n images (n captured images 3) acquired through the process of step S11.

For example, it is assumed that light is emitted according to a sine-wave pattern in the light-emitting surface (light-emitting surface 35) of the illumination device 20. In this case, a maximum point of a sine wave represents a maximum value of illumination intensity, a minimum point of the sine wave represents a minimum value of illumination intensity, and an intermediate point between the maximum point and the minimum point of the sine wave represents an intermediate value of illumination intensity. Meanwhile, the processing image 4 is referred to as "phase image 1" in FIG. 22.

Figure 23:
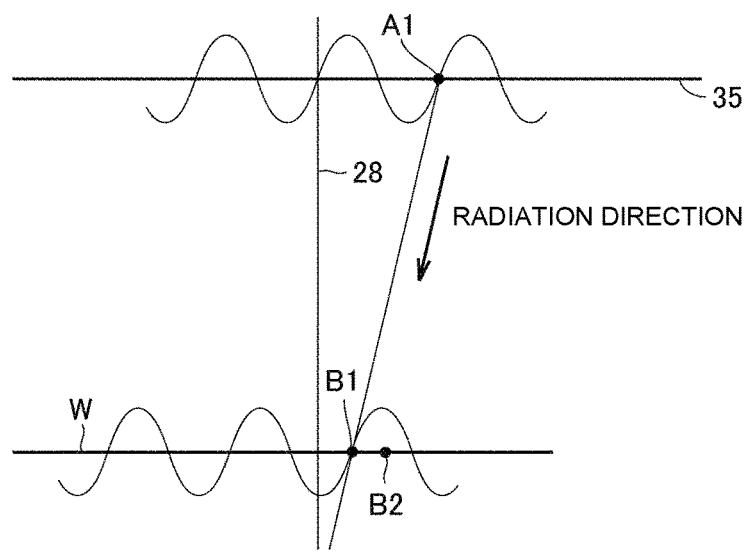
FIG. 23 is a schematic diagram for describing a method of obtaining a phase of an illumination pattern.

FIG. 23 is a schematic diagram for describing a method of obtaining a phase of an illumination pattern. As shown in FIG. 23, when light is radiated from the light-emitting surface 35 in a radiation direction, a certain point A1 on the light-emitting surface 35 is correlated with a point B1 on the surface of a workpiece W. For example, images of the surface of the workpiece W is captured using the camera 10 while changing the phase of a light emission pattern by 90° and luminance values (concentration values) of pixels may be recorded. In this case, four points representing a luminance value of a pixel are obtained. Thereafter, a sine wave is fitted to the four points. It is assumed that the fitted sine wave is represented as sin(x-a) when a reference wave is sin(x). In this case, the value a is a phase. That is, the method of obtaining a phase of an illumination pattern is a method of obtaining a phase difference from the reference wave. With respect to a point B2 on the surface of the workpiece W, a phase is also obtained through the same method.

Meanwhile, a luminance value has an error. Accordingly, the number of points representing a luminance value increases as a phase change decreases, and thus a phase with higher accuracy can be obtained.

Referring back to FIG. 22, the illumination device 20 performs second scanning of light and the camera 10 captures images of the workpiece W n times in step S13. Accordingly, n images are acquired. In step S14, the control device 100 generates the processing image 6 having a phase 13 of the illumination pattern as a pixel value from the n images (n captured images 5) obtained through the process of step S13. The process of step S13 is the same as the process of step S12 (refer to FIG. 23). Meanwhile, the processing image 6 is referred to as "phase image 2" in FIG. 22.

In step S15, the control device 100 calculates a distance D corresponding to a pixel of each coordinates (x, y) using phase image 1 (processing image 4) and phase image 2 (processing image 6).

Figure 24:
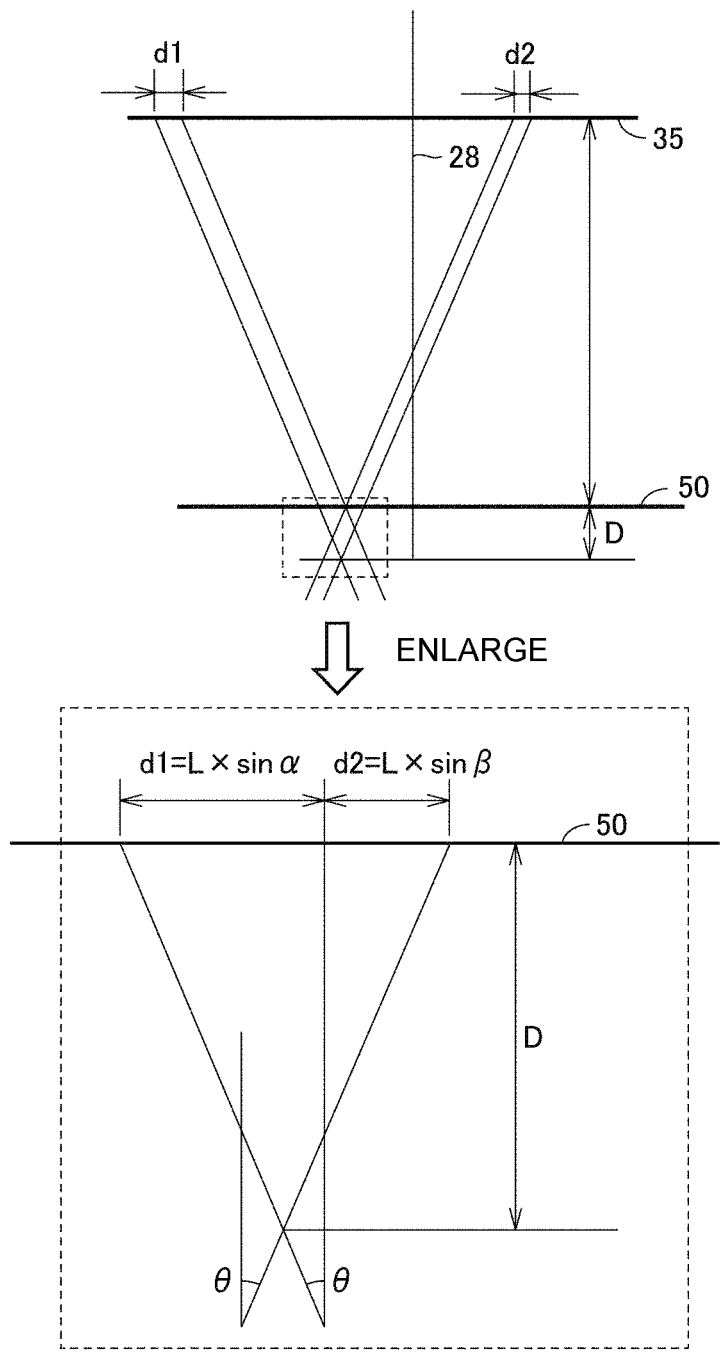
FIG. 24 is a diagram describing the principle of the distance calculation method according to embodiment 2.

FIG. 24 is a diagram describing the principle of the distance calculation method according to embodiment 2. In embodiment 2, the equation (4) is also established. Distances d1 and d2 are represented according to the following equations (5) and (6).

$$d1 = L \times \sin \alpha \quad (5)$$

$$d2 = L \times \sin \beta \quad (6)$$

L is a period of stripes of a striped pattern and thus is a known value. The phases α and β are pixel values (phase values) included in pixels of the processing image 4 and pixels of the processing image 6. Accordingly, it is possible to calculate the distance D by putting the equations (5) and (6) into the equation 4. Meanwhile, when a striped pattern with a fixed period is used, a relative distance from a virtual plane 50 parallel with the light-emitting surface 35, instead of the absolute distance D, can be calculated through the phase shift method. In embodiment 2, the distance D is the relative distance. Although FIG. 24 shows a single virtual plane (virtual plane 50), a plurality of candidates at specific intervals and in parallel with the light-emitting surface 35 may be present as virtual planes.

F. Modified Example of Configuration of Illumination Device

Figure 25:
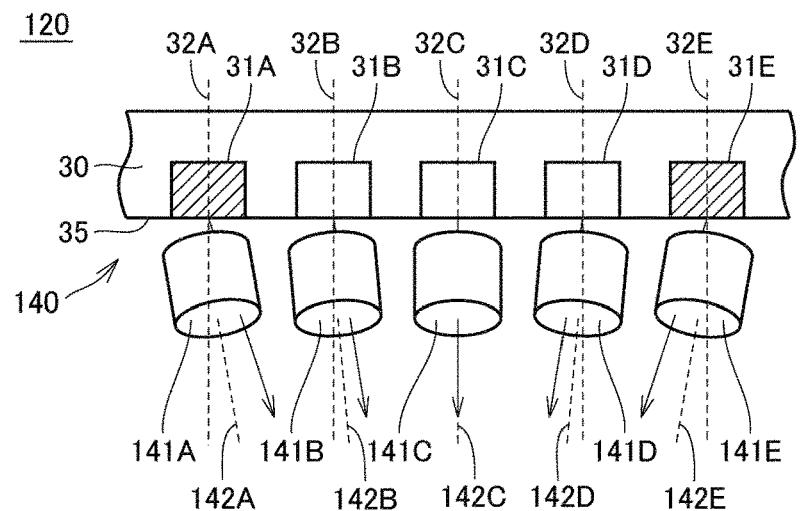
FIG. 25 is a schematic diagram showing a cross section of a part of an illumination device according to modified example 1.

FIG. 25 is a schematic diagram showing a cross section of a part of an illumination device 120 according to modified example 1. Compared to the illumination device 20 shown in FIG. 3, the illumination device 120 includes a micro-lens array 140 instead of the micro-lens array 40. The micro-lens array 140 includes a plurality of lenses 141 which are a plurality of micro-lenses disposed to face a plurality of light-emitting units 31. FIG. 25 representatively shows lenses 141A to 141E facing light-emitting units 31A to 31E.

Each of the lenses 141A to 141E is a rod lens. In the lenses 141A to 141E, angles of the optical axes (optical axes 142A to 142E) of the lenses to the optical axes (optical axes 32A to 32E) of the light-emitting units 31 are different. It is possible to change emission angles (angles to the optical axes of the lenses) of light emitted from emission surfaces of the rod lenses by changing incident angles of light to incident surfaces of the rod lenses. Accordingly, an emission direction of light can be changed for each light-emitting unit in the illumination device 120. It is possible to increase a distance between a workpiece W and the illumination device 120, in which the shape of the workpiece W can be inspected by using rod lenses.

Figure 26:
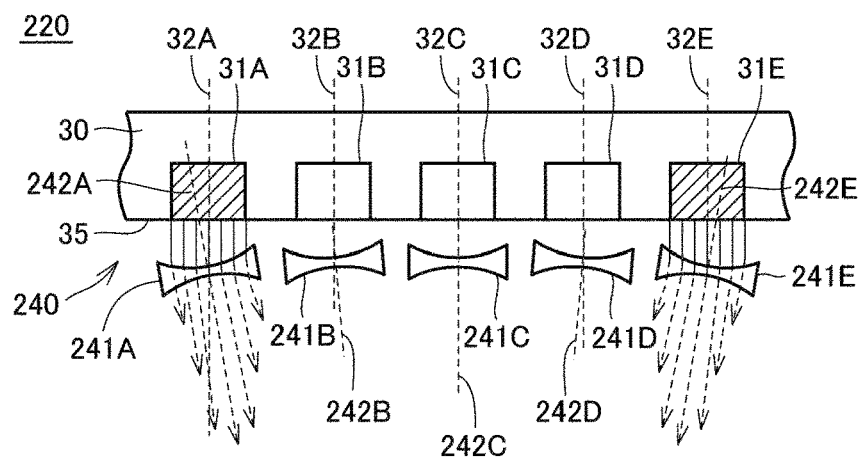
FIG. 26 is a schematic diagram showing a cross section of a part of an illumination device according to modified example 2.

FIG. 26 is a schematic diagram showing a cross section of a part of an illumination device 220 according to modified example 2. Compared to the illumination device 20 shown in FIG. 3, the illumination device 220 includes a micro-lens array 240 instead of the micro-lens array 40. The micro-lens array 240 includes a plurality of lenses 241 which are a plurality of micro-lenses disposed to face a plurality of light-emitting units 31. FIG. 26 representatively shows lenses 241A to 241E facing light-emitting units 31A to 31E.

Each of the lenses 241A to 241E is a concave lens. As in the modified example shown in FIG. 25, in the lenses 241A to 241E, angles of the optical axes of the lenses to the optical axes of the light-emitting units 31 are different. It is possible to change emission angles (angles to the optical axes of the lenses) of light emitted from the concave lenses by changing angles of the optical axes (optical axes 242A to 242E) of the lenses to the optical axes (optical axes 32A to 32E) of the light-emitting units.

Figure 27:
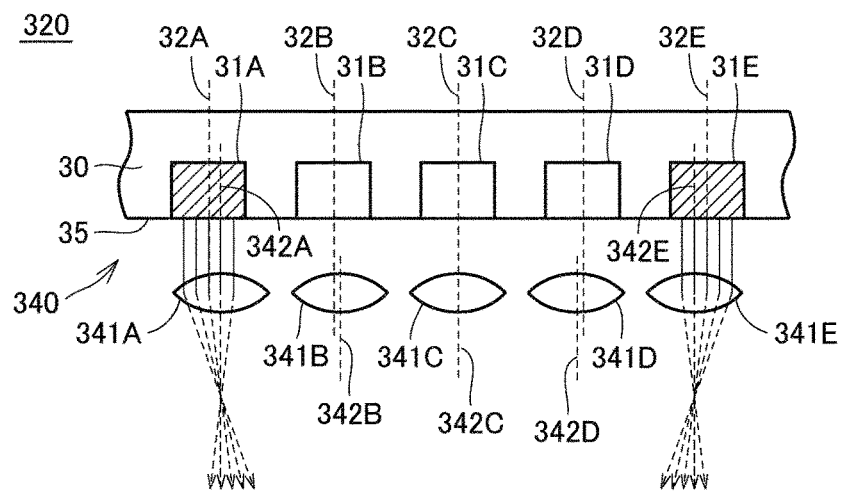
FIG. 27 is a schematic diagram showing a cross section of a part of an illumination device according to modified example 3.

FIG. 27 is a schematic diagram showing a cross section of a part of an illumination device 320 according to modified example 3. Compared to the illumination device 20 shown in FIG. 3, the illumination device 320 includes a micro-lens array 340 instead of the micro-lens array 40. The micro-lens array 340 includes a plurality of lenses 341 which are a plurality of micro-lenses disposed to face a plurality of light-emitting units 31. FIG. 27 representatively shows lenses 341A to 341E facing light-emitting units 31A to 31E.

In modified example 3, the lenses 41A to 41E in the configuration of FIG. 3 are substituted by the lenses 341A to 341E and the optical axes 42A to 42E are substituted by optical axes 342A to 342E. Each of the lenses 341A to 341E is a convex lens. However, the shape of each of the lenses 341A to 341E differs from the shapes of the lenses 41A to 41E. As in the example shown in FIG. 3, it is possible to control radiation directions of light emitted from light-emitting units through the lenses by changing relative positions of the optical axes (optical axes 342A to 342E) of the lenses with respect to the optical axes (optical axes 32A to 32E) of the light-emitting units.

In the illumination devices shown in FIGS. 25 and 26, illumination elements include a plurality of cells 22 arranged in a matrix form. It is possible to change inclination angles of the optical axes of the lenses to the optical axes of the light-emitting units according to positions of the cells in the plurality of cells 22. Further, the angle of the optical axis of a lens to the X axis and the angle of the optical axis of a lens to the Y axis may be different for each cell.

In addition, the light-shielding part 44 (refer to FIGS. 8 to 11) may be provided at the edges of the lenses in the micro-lens arrays 140, 240 and 340 shown in FIGS. 25 to 27.

G. Supplementary Notes

As described above, the present embodiment includes the following disclosure.

(Configuration 1)

An image inspection apparatus 1 including:

an image capturing unit 10 which captures images of an object W;

a transparent illumination unit 20, 120, 220 and 320 which is disposed between the object W and the image capturing unit 10, has a light-emitting surface 35 which radiates light to the object W and is configured to be able to control a light-emitting position on the light-emitting surface 35 and a radiation direction of the light; and a control unit 100 which is configured to control the image capturing unit 10 and the illumination unit 20, 120, 220 and 320, wherein the control unit 100 causes the illumination unit 20, 120, 220 and 320 to radiate light to the object W in a first direction and causes the light to scan by changing the light-emitting position on the light-emitting surface 35 in first scanning of the illumination unit 20, 120, 220 and 320, and causes the image capturing unit 10 to capture images of the object W during the first scanning, and the control unit 100 causes the illumination unit 20, 120, 220 and 320 to radiate light to the object W in a second direction different from the first direction and causes the light to scan by changing the light-emitting position on the light-emitting surface 35 in second scanning of the illumination unit 20, 120, 220 and 320, and causes the image capturing unit 10 to capture images of the object W during the second scanning, wherein the control unit 100 identifies the light-emitting position of the illumination unit 20, 120, 220 and 320 when a measurement point 13 of the surface of the object W is illuminated from images of the object W captured during the first scanning and the second scanning, and calculates a distance to the measurement point 13 on the basis of the identified light-emitting position, the first direction and the second direction.

(Configuration 2)

In the image inspection apparatus 1 described in configuration 1, the image capturing unit 10 captures images of the object W multiple times to generate a plurality of first captured images 3 during the first scanning and captures images of the object W multiple times to generate a plurality of second captured images 5 during the second scanning, and the control unit 100 generates a first processing image 4 having information about a first light-emitting position which is the light-emitting position for illuminating the measurement point 13 of the object W from the plurality of first captured images 3, generates a second processing image 6 having information about a second light-emitting position which is the light-emitting position for illuminating the measurement point 13 of the object W from the plurality of second captured images 5, and calculates the distance from the information about the first light-emitting position included in the first processing image 4, the information about the second light-emitting position included in the second processing image 6, the first direction and the second direction.

(Configuration 3)

In the image inspection apparatus 1 described in configuration 2, the illumination unit 20, 120, 220 and 320 radiates light in a line form to the object W during the first scanning and the second scanning, the control unit 100 determines the light-emitting position of the illumination unit 20, 120, 220 and 320 when the luminance of a pixel corresponding to the measurement point 13 is maximized as the first light-emitting position from the plurality of first captured images 3 and generates the first processing image 4 by including the first light-emitting position in information about the pixel, and the control unit 100 determines the light-emitting position of the illumination unit 20, 120, 220 and 320 when the luminance of the pixel corresponding to the measurement point 13 is maximized as the second light-emitting position from the plurality of second captured images 5 and generates the second processing image 6 by including the second light-emitting position in information about the pixel.

(Configuration 4)

In the image inspection apparatus 1 described in configuration 2, the illumination unit 20, 120, 220 and 320 radiates light in a striped pattern to the object W and generates a state equivalent to scanning of the light by changing the phase of the striped pattern during the first scanning and the second scanning, and the control unit 100 generates the first processing image 4 from the plurality of first captured images 3 by including information about a first phase a of the striped pattern in the information about the pixel as information about the first light-emitting position, and the control unit 100 generates the second processing image 6 from the plurality of second captured images 5 by including information about a second phase 13 of the striped pattern in the information about the pixel as information about the second light-emitting position.

(Configuration 5)

In the image inspection apparatus 1 described in any of configurations 1 to 4, the illumination unit 20, 120, 220 and 320 includes a plurality of light-emitting units 31 and 31A to 31E which are arranged in a matrix form and configured to be able to selectively emit light, and an optical system 40, 140, 240 and 340 which is configured to control a radiation direction of light emitted from each of the plurality of light-emitting units 31 and 31A to 31E to be a direction corresponding to the position of each of the plurality of light-emitting units 31 and 31A to 31E.

(Configuration 6)

In the image inspection apparatus 1 described in configuration 5, the optical system 40, 140, 240 and 340 includes a plurality of micro-lenses 41, 41A to 41E, 141A to 141E, 241A to 241E and 341A to 341E provided to face the plurality of light-emitting units 31 and 31A to 31E.

(Configuration 7)

In the image inspection apparatus 1 described in configuration 6, the plurality of micro-lenses 41, 41A to 41E, 141A to 141E, 241A to 241E and 341A to 341E are disposed such that optical axes 42, 42A to 42E, 142A to 142E, 242A to 242E and 342A to 342E of at least some of the plurality of micro-lenses deviate from optical axes 32, 32A to 32E of light-emitting units facing the at least some of the micro-lenses.

(Configuration 8)

In the image inspection apparatus 1 described in configuration 7, the illumination unit 20, 120, 220 and 320 is sectioned into a plurality of illumination elements 21, and the at least some of the micro-lenses 41, 41A to 41E and 341A to 341E are disposed at a pitch P2 less than a pitch P1 of the light-emitting units 31 and 31A to 31E in at least one of the plurality of illumination elements 21.

(Configuration 9)

In the image inspection apparatus 1 described in configuration 6, the plurality of micro-lenses 141A to 141E and 241A to 241E are disposed such that the optical axes 142A to 142E and 242A to 242E of at least some of the plurality of micro-lenses 141A to 141E and 241A to 241E are inclined with respect to the optical axes 32 and 32A to 32E of light-emitting units 31 and 31A to 31E facing the at least some of the micro-lenses.

(Configuration 10)

In the image inspection apparatus 1 described in any of configurations 6 to 9, the illumination unit 20, 120, 220 and 320 further includes a light-shielding part 44 configured to shield light leaking from the edge of each of the plurality of micro-lenses among light emitted from the plurality of light-emitting units 31 and 31A to 31E.

(Configuration 11)

An image inspection method performed by an image inspection apparatus 1 including: an image capturing unit 10 which captures images of an object W; a transparent illumination unit 20, 120, 220 and 320 which is disposed between the object W and the image capturing unit 10, has a light-emitting surface 35 which radiates light to the object W and is configured to be able to control a light-emitting position on the light-emitting surface 35 and a radiation direction of the light; and a control unit 100 which is configured to control the image capturing unit 10 and the illumination unit 20, 120, 220 and 320, the image inspection method including:

a step S1 and S11 in which the illumination unit 20, 120, 220 and 320 radiates light to the object W in a first direction and causes the light to scan by changing the light-emitting position on the light-emitting surface 35 in first scanning, and the image capturing unit 10 captures images of the object W during the first scanning;

a step S3 and S13 in which the illumination unit 20, 120, 220 and 320 radiates light to the object W in a second direction different from the first direction and causes the light to scan by changing the light-emitting position on the light-emitting surface 35 in second scanning, and the image capturing unit 10 captures images of the object W during the second scanning; and a step S2, S4, S5, S12, S14 and S15 in which the control unit 100 identifies the light-emitting position of the illumination unit 20, 120, 220 and 320 when a measurement point 13 of the object W is illuminated from images of the object W captured during the first scanning and the second scanning, and calculates a distance to the measurement point 13 on the basis of the identified light-emitting position, the first direction and the second direction.

(Configuration 12)

In the image inspection method described in configuration 11, the step S1 and S11 in which the image capturing unit 10 captures images of the object W during the first scanning includes a step in which the image capturing unit 10 captures images of the object W multiple times to generate a plurality of first captured images 3, the step S3 and S13 in which the image capturing unit 10 captures images of the object W during the second scanning includes a step in which the image capturing unit 10 captures images of the object W multiple times to generate a plurality of second captured images 5, and the step S2, S4, S5, S12, S14 and S15 of calculating the distance includes a step S2 and S12 in which the control unit 100 generates a first processing image 4 having information about a first light-emitting position which is the light-emitting position for illuminating the measurement point 13 of the object W from the plurality of first captured images 3, a step S4 and S14 in which the control unit 100 generates a second processing image 6 having information about a second light-emitting position which is the light-emitting position for illuminating the measurement point 13 of the object W from the plurality of second captured images 5, and a step S5 and S15 of calculating the distance from the information about the first light-emitting position included in the first processing image 4, the information about the second light-emitting position included in the second processing image 6, the first direction and the second direction.

(Configuration 13)

In the image inspection method described in configuration 12, the step S1 and S3 in which the illumination unit 20, 120, 220 and 320 radiates the light to the object W includes a step in which the illumination unit 20, 120, 220 and 320 radiates light in a pattern in a line form to the object W, the step S2 of generating the first processing image 4 includes a step in which the control unit 100 determines the light-emitting position of the illumination unit 20, 120, 220 and 320 when the luminance of a pixel corresponding to the measurement point 13 is maximized as the first light-emitting position from the plurality of first captured images 3 and generates the first processing image 4 by including the first light-emitting position in information about the pixel, and the step S4 of generating the second processing image 6 includes a step in which the control unit 100 determines the light-emitting position of the illumination unit 20, 120, 220 and 320 when the luminance of the pixel corresponding to the measurement point 13 is maximized as the second light-emitting position from the plurality of second captured images 5 and generates the second processing image 6 by including the second light-emitting position in information about the pixel.

(Configuration 14)

In the image inspection method described in configuration 12, the step S11 and S13 in which the illumination unit 20, 120, 220 and 320 radiates the light to the object W includes a step in which the illumination unit 20, 120, 220 and 320 radiates light in a striped pattern to the object W and generates a state equivalent to scanning of the light by changing the phase of the striped pattern, the step S12 of generating the first processing image 4 includes a step in which the control unit 100 generates the first processing image 4 from the plurality of first captured images 3 by including information about a first phase a of the striped pattern in the information about the pixel as information about the first light-emitting position, and the step S14 of generating the second processing image 6 includes a step in which the control unit 100 generates the second processing image 6 from the plurality of second captured images 5 by including information about a second phase 13 of the striped pattern in the information about the pixel as information about the second light-emitting position.

The embodiments disclosed herein are to be construed in all aspects as illustrative and not restrictive. The scope of the present disclosure should be determined by the appended claims and their legal equivalents, not by the above description, and all changes coming within the meaning and equivalency range of the appended claims are intended to be embraced therein. In addition, the disclosures described in embodiments and modified examples are intended to be embodied in an independent or a combined manner.

What is claimed is:

1. An image inspection apparatus comprising:
   an image capturing unit which captures images of an object;
   a transparent illumination unit which is disposed between the object and the image capturing unit, has a light-emitting surface which radiates light to the object and is configured to be able to control a light-emitting position on the light-emitting surface and a radiation direction of the light; and
   a processor which is configured to control the image capturing unit and the illumination unit,
   wherein the processor causes the illumination unit to radiate light to the object in a first direction and causes the light to scan by changing the light-emitting position on the light-emitting surface in first scanning of the illumination unit, and causes the image capturing unit to capture images of the object during the first scanning, and
   the processor causes the illumination unit to radiate light to the object in a second direction reverse to the first direction and causes the light to scan by changing the light-emitting position on the light-emitting surface in second scanning of the illumination unit, and causes the image capturing unit to capture images of the object during the second scanning, and
   wherein the processor identifies the light-emitting position of the illumination unit when a measurement point of the surface of the object is illuminated from images of the object captured during the first scanning and the second scanning, and calculates a distance to the measurement point on the basis of the identified light-emitting position, the first direction and the second direction.

2. The image inspection apparatus according to claim 1, wherein the image capturing unit captures images of the object multiple times to generate a plurality of first captured images during the first scanning and captures images of the object multiple times to generate a plurality of second captured images during the second scanning, and
   the processor generates a first processing image having information about a first light-emitting position which is the light-emitting position for illuminating the measurement point of the object from the plurality of first captured images,
   the processor generates a second processing image having information about a second light-emitting position which is the light-emitting position for illuminating the measurement point of the object from the plurality of second captured images, and
   the processor calculates the distance from the information about the first light-emitting position included in the first processing image, the information about the second light-emitting position included in the second processing image, the first direction and the second direction.

3. The image inspection apparatus according to claim 2, wherein the illumination unit radiates light in a line form to the object during the first scanning and the second scanning,
   the processor determines the light-emitting position of the illumination unit when the luminance of a pixel corresponding to the measurement point is maximized as the first light-emitting position from the plurality of first captured images and generates the first processing image by including the first light-emitting position in information about the pixel, and
   the processor determines the light-emitting position of the illumination unit when the luminance of the pixel corresponding to the measurement point is maximized as the second light-emitting position from the plurality of second captured images and generates the second processing image by including the second light-emitting position in information about the pixel.

4. The image inspection apparatus according to claim 3, wherein the illumination unit comprises:
   a plurality of light-emitting units which are arranged in a matrix form and configured to be able to selectively emit light; and
   an optical system which is configured to control a radiation direction of light emitted from each of the plurality of light-emitting units to be a direction corresponding to the position of each of the plurality of light-emitting units.

5. The image inspection apparatus according to claim 2, wherein the illumination unit radiates light in a striped pattern to the object and generates a state equivalent to scanning of the light by changing the phase of the striped pattern during the first scanning and the second scanning, and
   the processor generates the first processing image from the plurality of first captured images by including information about a first phase of the striped pattern in the information about the pixel as information about the first light-emitting position, and
   the processor generates the second processing image from the plurality of second captured images by including information about a second phase of the striped pattern in the information about the pixel as information about the second light-emitting position.

6. The image inspection apparatus according to claim 5, wherein the illumination unit comprises:
   a plurality of light-emitting units which are arranged in a matrix form and configured to be able to selectively emit light; and
   an optical system which is configured to control a radiation direction of light emitted from each of the plurality of light-emitting units to be a direction corresponding to the position of each of the plurality of light-emitting units.

7. The image inspection apparatus according to claim 2, wherein the illumination unit comprises:
   a plurality of light-emitting units which are arranged in a matrix form and configured to be able to selectively emit light; and
   an optical system which is configured to control a radiation direction of light emitted from each of the plurality of light-emitting units to be a direction corresponding to the position of each of the plurality of light-emitting units.

8. The image inspection apparatus according to claim 1, wherein the illumination unit comprises:
   a plurality of light-emitting units which are arranged in a matrix form and configured to be able to selectively emit light; and
   an optical system which is configured to control a radiation direction of light emitted from each of the plurality of light-emitting units to be a direction corresponding to the position of each of the plurality of light-emitting units.

9. The image inspection apparatus according to claim 8, wherein the optical system comprises a plurality of microlenses provided to face the plurality of light-emitting units.

10. The image inspection apparatus according to claim 9, wherein the plurality of micro-lenses are disposed such that optical axes of at least some of the plurality of micro-lenses deviate from optical axes of light-emitting units facing the at least some of the micro-lenses.

11. The image inspection apparatus according to claim 10, wherein the illumination unit is sectioned into a plurality of illumination elements, and
the at least some of the micro-lenses are disposed at a pitch less than a pitch of the light-emitting units in at least one of the plurality of illumination elements.

12. The image inspection apparatus according to claim 11, wherein the illumination unit further comprises a light-shielding part configured to shield light leaking from the edge of each of the plurality of micro-lenses among light emitted from the plurality of light-emitting units.

13. The image inspection apparatus according to claim 10, wherein the illumination unit further comprises a light-shielding part configured to shield light leaking from the edge of each of the plurality of micro-lenses among light emitted from the plurality of light-emitting units.

14. The image inspection apparatus according to claim 9, wherein the plurality of micro-lenses are disposed such that the optical axes of at least some of the plurality of micro-lenses are inclined with respect to the optical axes of light-emitting units facing the at least some of the micro-lenses.

15. The image inspection apparatus according to claim 14, wherein the illumination unit further comprises a light-shielding part configured to shield light leaking from the edge of each of the plurality of micro-lenses among light emitted from the plurality of light-emitting units.

16. The image inspection apparatus according to claim 9, wherein the illumination unit further comprises a light-shielding part configured to shield light leaking from the edge of each of the plurality of micro-lenses among light emitted from the plurality of light-emitting units.

17. An image inspection method performed by an image inspection apparatus including: an image capturing unit which captures images of an object; a transparent illumination unit which is disposed between the object and the image capturing unit, has a light-emitting surface which radiates light to the object and is configured to be able to control a light-emitting position on the light-emitting surface and a radiation direction of the light; and a processor which is configured to control the image capturing unit and the illumination unit, the image inspection method comprising:
a step in which the illumination unit radiates light to the object in a first direction and causes the light to scan by changing the light-emitting position on the light-emitting surface in first scanning, and the image capturing unit captures images of the object during the first scanning;
a step in which the illumination unit radiates light to the object in a second direction reverse to the first direction and causes the light to scan by changing the light-emitting position on the light-emitting surface in second scanning, and the image capturing unit captures images of the object during the second scanning; and
a step in which the processor identifies the light-emitting position of the illumination unit when a measurement point of the surface of the object is illuminated from images of the object captured during the first scanning and the second scanning, and calculates a distance to the measurement point on the basis of the identified light-emitting position, the first direction and the second direction.

18. The image inspection method according to claim 17, wherein the step in which the image capturing unit captures images of the object during the first scanning comprises a step in which the image capturing unit captures images of the object multiple times to generate a plurality of first captured images,
the step in which the image capturing unit captures images of the object during the second scanning comprises a step in which the image capturing unit captures images of the object multiple times to generate a plurality of second captured images, and
the step of calculating the distance comprises:
a step in which the processor generates a first processing image having information about a first light-emitting position which is the light-emitting position for illuminating the measurement point of the object from the plurality of first captured images;
a step in which the processor generates a second processing image having information about a second light-emitting position which is the light-emitting position for illuminating the measurement point of the object from the plurality of second captured images; and
a step of calculating the distance from the information about the first light-emitting position included in the first processing image, the information about the second light-emitting position included in the second processing image, the first direction and the second direction.

19. The image inspection method according to claim 18, wherein the step in which the illumination unit radiates the light to the object comprises a step in which the illumination unit radiates light in a pattern of a line form to the object,
the step of generating the first processing image comprises a step in which the processor determines the light-emitting position of the illumination unit when the luminance of a pixel corresponding to the measurement point is maximized as the first light-emitting position from the plurality of first captured images and generates the first processing image by including the first light-emitting position in information about the pixel, and
the step of generating the second processing image comprises a step in which the processor determines the light-emitting position of the illumination unit when the luminance of the pixel corresponding to the measurement point is maximized as the second light-emitting position from the plurality of second captured images and generates the second processing image by including the second light-emitting position in information about the pixel.

20. The image inspection method according to claim 18, wherein the step in which the illumination unit radiates the light to the object comprises a step in which the illumination unit radiates light in a striped pattern to the object and generates a state equivalent to scanning of the light by changing the phase of the striped pattern,
the step of generating the first processing image comprises a step in which the processor generates the first processing image from the plurality of first captured images by including information about a first phase of the striped pattern in the information about the pixel as information about the first light-emitting position, and
the step of generating the second processing image comprises a step in which the processor generates the second processing image from the plurality of second captured images by including information about a second phase of the striped pattern the information about the pixel as information about the second light-emitting position.

\* \* \* \* \*